United States Patent [19]
Fukuchi et al.

[11] Patent Number: 5,162,821
[45] Date of Patent: Nov. 10, 1992

[54] COLOR IMAGE FORMING APPARATUS

[75] Inventors: Masakazu Fukuchi; Satoshi Haneda; Hisashi Shoji; Kunihisa Yoshino; Yoshiyuki Ichihara, all of Hachioji, Japan

[73] Assignee: Konica Corporation, Tokyo, Japan

[21] Appl. No.: 750,708

[22] Filed: Aug. 20, 1991

Related U.S. Application Data

[63] Continuation of Ser. No. 522,501, May 11, 1990, abandoned, which is a continuation of Ser. No. 131,020, Dec. 9, 1987, abandoned.

[30] Foreign Application Priority Data

| Dec. 9, 1986 | [JP] | Japan | 61-294290 |
| Dec. 23, 1986 | [JP] | Japan | 61-305283 |
| Jan. 9, 1987 | [JP] | Japan | 62-1696 |
| Jan. 9, 1987 | [JP] | Japan | 62-1697 |
| Jan. 9, 1987 | [JP] | Japan | 62-2815 |

[51] Int. Cl.$^5$ .......................................... G01D 15/06
[52] U.S. Cl. ..................................... 346/157; 355/326
[58] Field of Search ............... 355/326, 327, 328, 245, 355/210; 430/42, 45; 358/75; 346/157, 160

[56] References Cited

U.S. PATENT DOCUMENTS

| 4,403,848 | 9/1983 | Snelling | 355/327 |
|---|---|---|---|
| 4,416,533 | 11/1983 | Tokunaga et al. | 355/326 X |
| 4,540,272 | 9/1985 | Abe et al. | 355/327 |
| 4,572,651 | 2/1986 | Komatsu et al. | 355/326 X |
| 4,578,331 | 3/1986 | Ikeda et al. | 355/327 X |
| 4,580,889 | 4/1986 | Hiranuma et al. | 358/75 X |
| 4,590,514 | 5/1986 | Ikeda | 358/75 |
| 4,679,929 | 7/1987 | Haneda et al. | 355/327 X |
| 4,743,938 | 5/1988 | Ohno | 355/327 |
| 4,746,951 | 5/1988 | Hayakawa et al. | 355/245 |
| 4,803,514 | 2/1989 | Hiratsuka et al. | 355/327 X |

FOREIGN PATENT DOCUMENTS

| 3525414 | 1/1986 | Fed. Rep. of Germany . |
| 2542150 | 9/1984 | France . |
| 2557749 | 7/1985 | France . |
| 0198259 | 9/1986 | Japan . |

OTHER PUBLICATIONS

Patent Abstracts of Japan vol. 9, No. 95 [E-310][1818] Apr. 24, 1985; JPA-59-221, 166; May 31, 1983.

Primary Examiner—A. T. Grimley
Assistant Examiner—Robert Beatty
Attorney, Agent, or Firm—Jordan B. Bierman

[57] ABSTRACT

A color image forming apparatus including a color image reader for optically scanning a document to produce blue, green, and red color separated information, a processor for processing the color separating information supplied by the reader and generating black, yellow, magenta, and cyan color information signals, a rotatable image retainer, and two latent image forming devices for forming latent images at a common region on the image retainer in accordance with the color information signals corresponding to two recording colors. The first latent image is formed by one of the latent image forming devices in synchronization with the scanning of the color image recorder to form a first latent image at a first writing position. The second latent image forming device is delayed to form the second latent image at a second writing position. The delay device compensates for the time necessary for the common region on the image retainer to travel between the first and second writing positions. The apparatus further includes a number of developers, each developer being used to develop one of the latent images, thereby forming a multicolor image composed of multiple toner images on the image retainer. Two color latent images, corresponding to two of the color information signals, are formed on the image retainer and developed by the developing means during the first rotation of the image retainer corresponding to a first optical scanning of the document, and the remaining two color latent images, corresponding to the remaining two color information signals are formed on the image retainer and developed by the developing devices during a second rotation of the image retainer corresponding to a second scanning of the document. All the toner images are then simultaneously transferred to the transfer sheet.

22 Claims, 18 Drawing Sheets

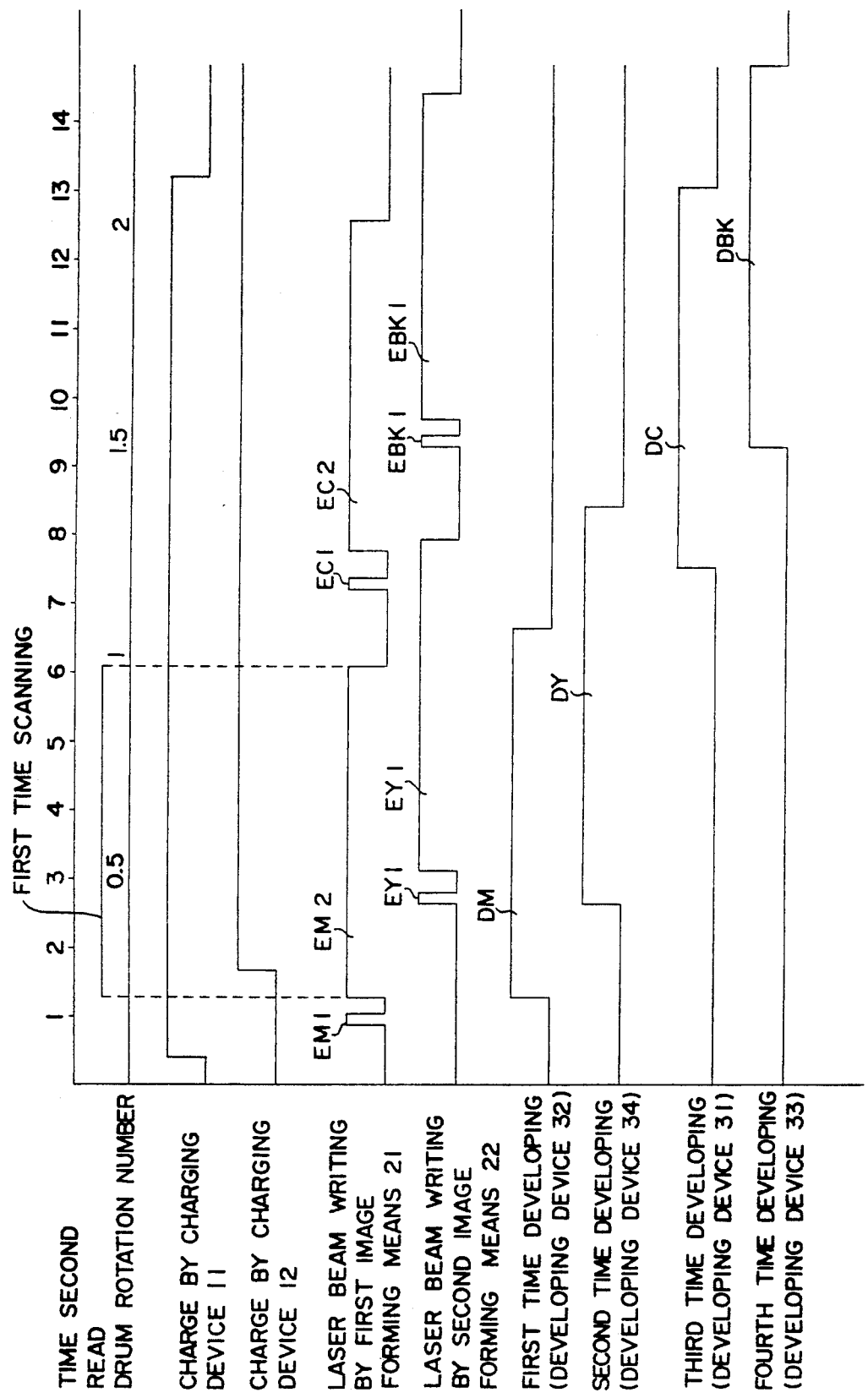

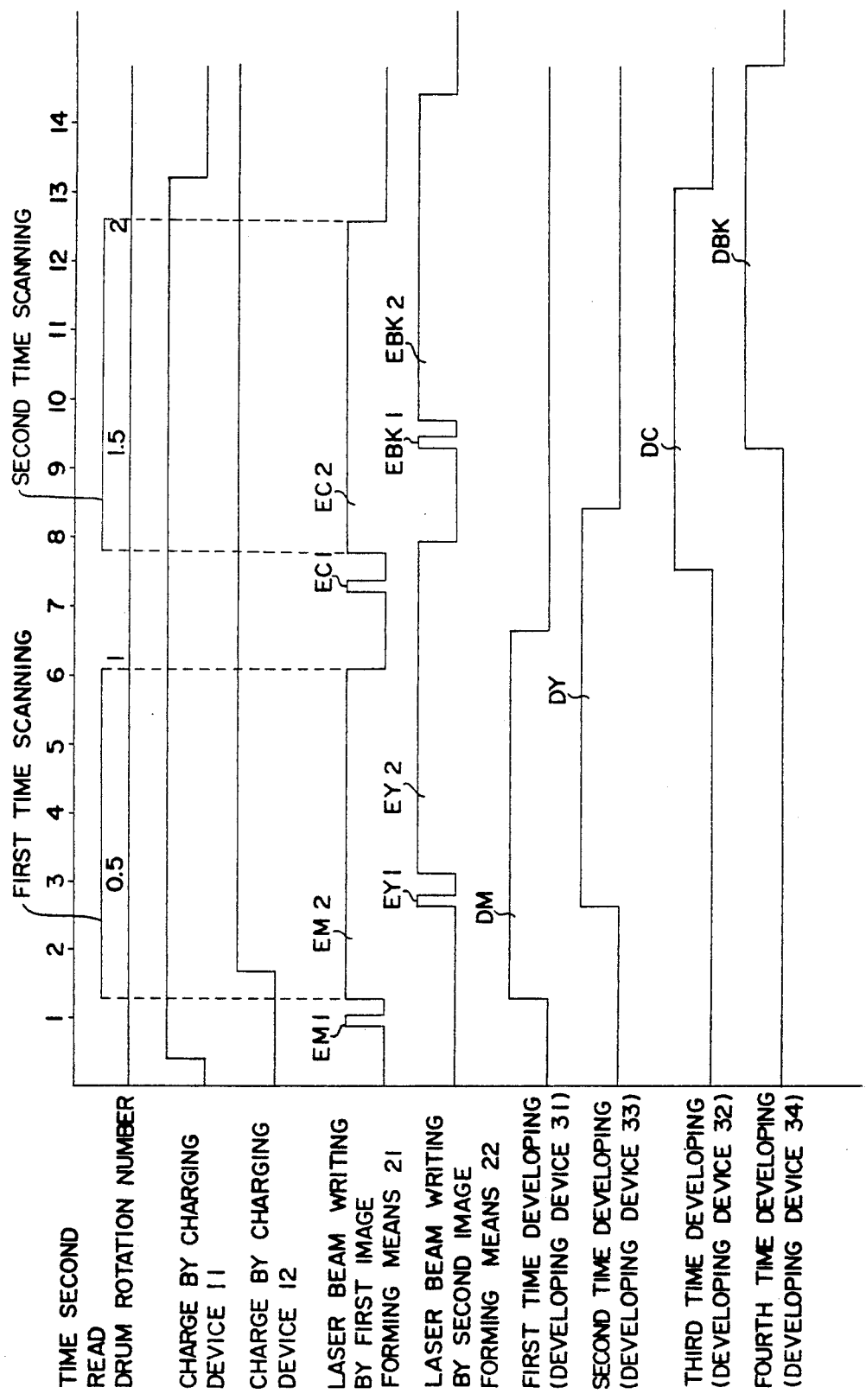

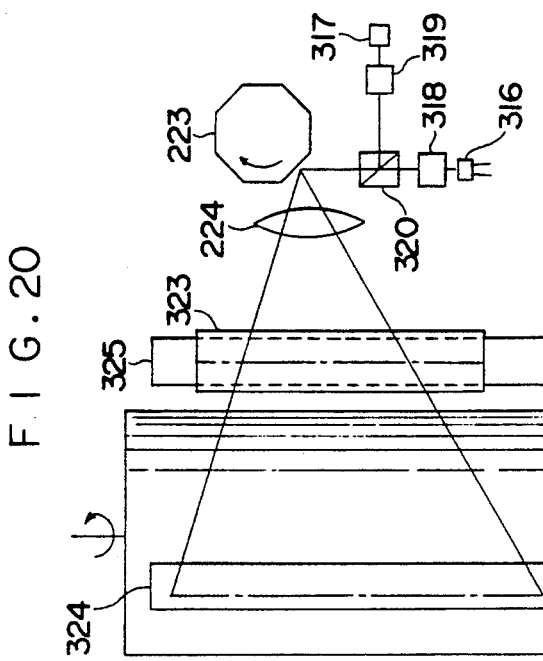
FIG. 20
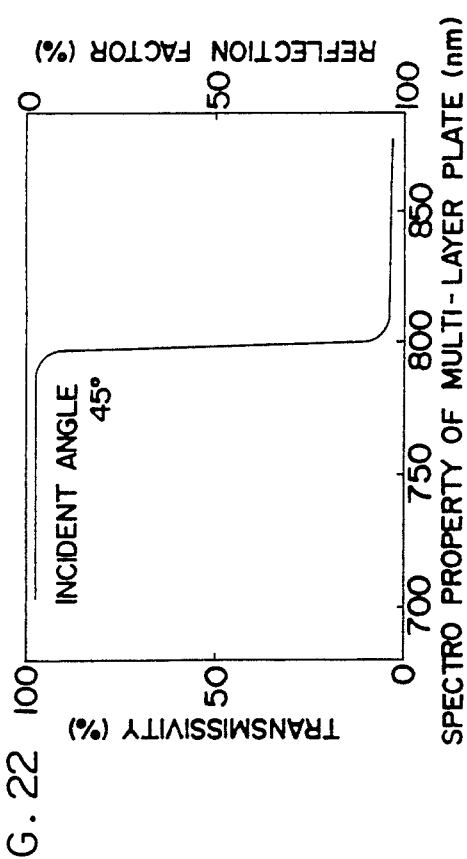
FIG. 21
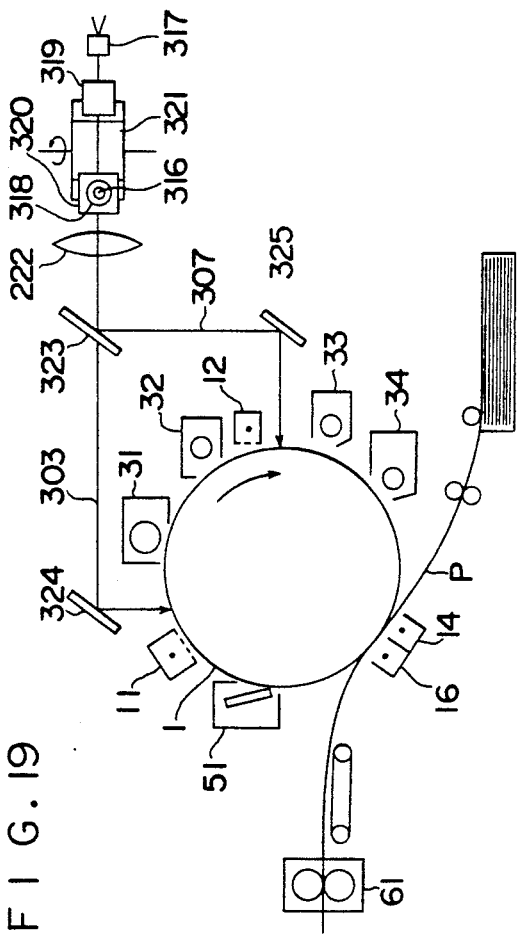
FIG. 19
FIG. 22

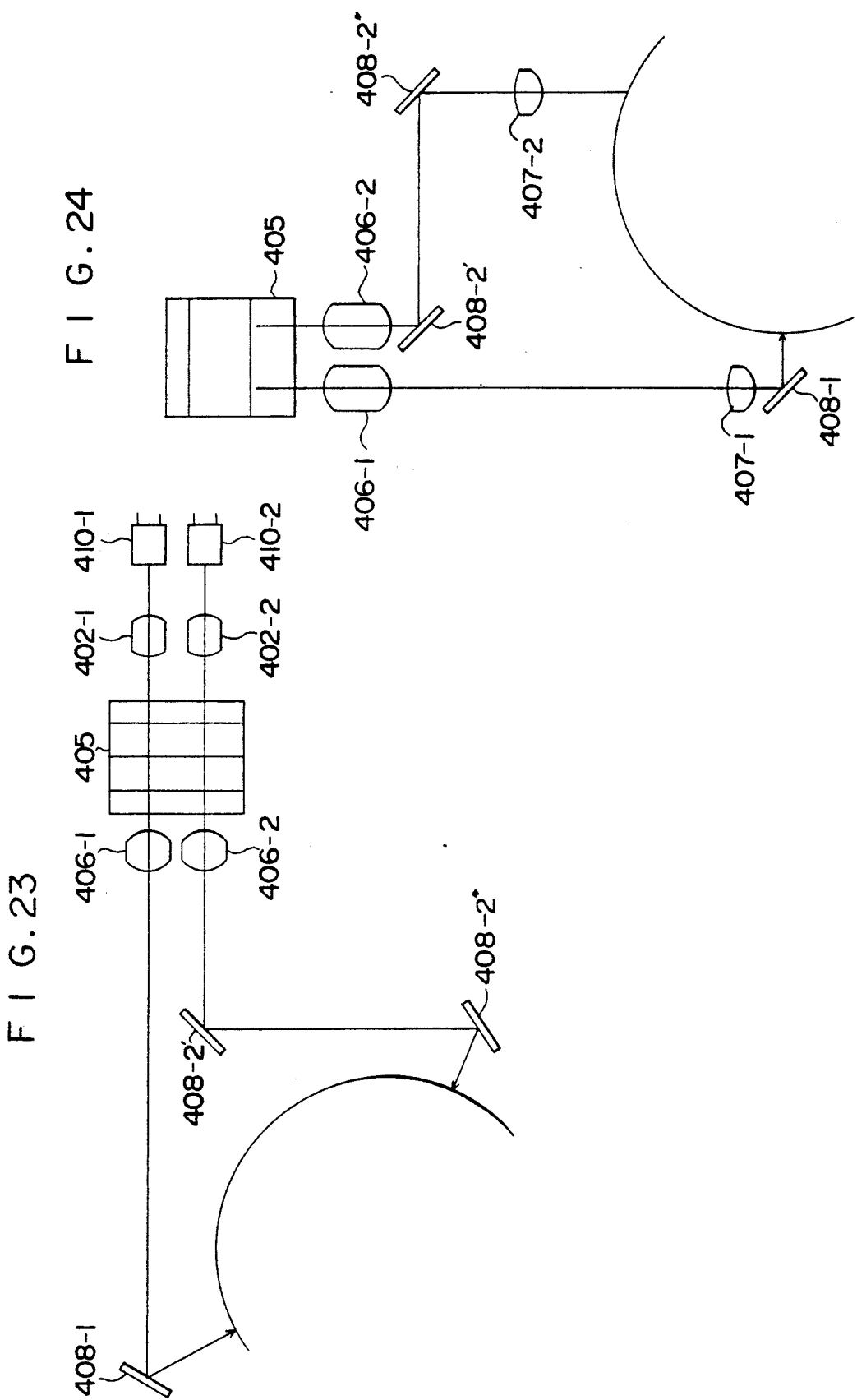

COLOR IMAGE FORMING APPARATUS

This application is a continuation of application Ser. No. 07/522,501, filed May 11, 1990, now abandoned, which is a continuation of application Ser. No. 131,020, filed Dec. 9, 1987, now abandoned.

BACKGROUND OF THE INVENTION

1. Field of the Invention

The present invention relates to color image forming apparatuses, and more particularly to a color image forming apparatus suitable for an image forming by electrophotography.

2. Background of the Invention

In recent years, in image formation by electrophotography, an image forming apparatus has appeared where an original image (document) of full color is used and a copy of full color is obtained. A multicolor image readily not only enables one to reproduce a person, a still life, a landscape or the like but it also allows for the incorporation of a great amount of additional information in one recording image and makes the process significantly favorable for a drawing, a table or the like.

Under such circumstances, various methods and apparatuses for multicolor image forming have been proposed.

For example, a method has been disclosed where a plurality of latent image forming means and a plurality of developing means are arranged around a rotating drum-shaped photosensitive member, and the latent image forming and the developing are repeated, whereby visible images that are different from each other in color are formed in a superposed manner on the drum-shaped photosensitive member and the superposed images are transferred at one time onto a recording paper (Japanese Pat. Laid Open Nos. 52-106743, 56-144452, 58-79261, 61-170754).

Another method has been disclosed where one latent image forming means and a plurality of developing means are arranged around a rotating drum-shaped photosensitive member, and the latent image forming and the developing regarding one color are performed per each rotation of the photosensitive member, thereby multicolor visible images are formed by a plurality of rotations of the photosensitive member and the multicolor images are transferred at one time onto a recording paper (Japanese Pat. Laid Open Nos. 60-76766, 60-95456, 61-170754).

In the method of the former, when color to be reproduced is a full color composed of yellow, magenta, cyan and black if necessary, the latent image forming means and the developing means respectively are the same in number as the colors used and must be arranged around the photosensitive member causing the diameter of the photosensitive member to become large. Furthermore, during the latent image forming, in order to assure registration of each color separation latent image, a control device to improve the write accuracy of the latent image forming means, such as a laser, LED, LCS or the like, are necessary. On the other hand, since the read scan of one time is sufficient, registration of read is good but an image memory of large capacity is necessary.

In the method of the latter, since only one latent image forming means is used, the apparatus becomes compact in comparison to the method of the former. Particularly since the latent image forming means can be used commonly, this method is advantageous in the registration of a latent image. However, the photosensitive member must be rotated the same number of times as the colors and therefore the speed of multicolor image forming becomes slow. On the other hand, when the image memory is not provided, the read scan is performed three or four times, thereby the registration of the read means becomes a problem in contrast to the method of the former.

In a conventional image forming apparatus where a plurality of laser rays are individually scanned and a composite image is formed on a photosensitive member, rotary polygon mirrors of the scanning means and $f-\theta$ lenses for correcting the spot incident distribution of laser rays and the focus variation are necessitated by the number of the laser rays. Moreover, the spot incident positions of the plurality of laser rays must be suitably registered. The exact and stable registration is very difficult because the rotary polygon mirrors include variations in the rotational speed and the surface precision.

In order to eliminate the above-mentioned problems, an image recording apparatus is proposed in Japanese Pat. Laid Open No. 56-161566 where when two laser beams are incident at different angles to the same surface of one rotary polygon mirror and the scanned laser rays are incident to a photosensitive member through a common $f-\theta$ lens, a laser ray being incident slantwise to the rotary axis of the rotary polygon mirror is made incident through a cylindrical lens correcting distortion of the scanning line. Also an image recording apparatus is proposed in Japanese Pat. Laid Open No. 58-95361 where two laser beams are incident respectively to different surfaces of one rotary polygon mirror, and the respectively scanned laser rays are incident through a $f-\theta$ lens to separate electrophotographic sensitive members, and further toner images formed on the electrophotographic sensitive members are transferred onto a transfer paper and composed. Apart from the point that laser rays in the latter apparatus are incident to separate electrophotographic sensitive members and toner images are formed and therefore the registration is difficult, optical systems of both recording apparatuses will be compared. In the former, since two laser rays are incident to the same surface of the rotary polygon mirror, although a problem of difficulty of the registration due to variation of the surface precision is small in comparison to the latter where laser rays are incident on different surfaces, the problem cannot be entirely eliminated because of the difference in incident angles and there is another problem in that the cylindrical lens for correction is necessary. In the latter, since two laser rays can be incident respectively orthogonal to the rotary axis of the rotary polygon mirror, a cylindrical lens is not required. However, since two laser rays are incident to different surfaces as above described, difficulty in registration due to variation in the surface precision becomes large in comparison to the former. Also a problem exists in that a $f-\theta$ lens is required for each laser ray, and further an essential problem exists in that the scanning directions of two laser rays are reverse to each other.

Also in a conventional color image forming apparatus as above described, developing devices can be installed and detached individually, and when all developing devices are installed or detached for inspection or maintenance, a problem exists in that much labor is required. As a color image forming apparatus to eliminate the problem, the present inventors previously invented an apparatus having one electrostatic image forming means where all of plural developing devices are enclosed in one case and therefore can be installed and detached together with the case. In this constitution, however, when the developing devices become 3-4 in number, the case becomes large and heavy and therefore a problem exists in that the case is inconvenient for installing or detaching and also the setting accuracy of the developing devices is liable to be deteriorated. On the other hand, in an apparatus having a plurality of electrostatic image forming means, since the distance between the developing devices becomes longer, if all developing devices are enclosed in one case and then installed or detached together with the case, the above-mentioned problem will become even more serious.

SUMMARY OF THE INVENTION

An object of the invention is to provide a color image forming apparatus wherein the above-mentioned problems of the image forming methods in the prior art are eliminated, and image forming can be performed at high speed without making the apparatus large.

Another object of the invention is to provide a color image forming apparatus wherein a clear color image without color slippage can be formed, and the memory capacity can be significantly decreased.

The foregoing objects can be attained by a color image forming apparatus comprising a color image read means for performing optical scanning of a document, means for producing color information in synchronization with the optical scanning of the document on the basis of color separation information inputted from the read means, and a plurality of image forming means for outputting the color information onto an image retainer, wherein a color image is formed on the image retainer by plural rotations of the image retainer.

Another object of the invention is to provide an image forming apparatus with an optical system to eliminate the problem of both apparatuses, wherein one rotary polygon mirror or one $f-\theta$ lens is sufficient for a plurality of laser rays, a cylindrical lens is not required after the $f-\theta$ lens, the plurality of laser rays use the same scanning direction, difficulty in registration due to variation of the surface precision of the rotary polygon mirror can be entirely eliminated.

The above object of the invention can be attained by an image forming apparatus where a plurality attained by an image of scanned laser rays are incident to a surface of a photosensitive member at different positions respectively and a composite image is formed, laser rays being different in wavelength are used as the plurality of laser rays, the plurality of laser rays are combined in the same optical path by a combining means and incident to a rotary polygon mirror, and reflected laser rays are separated again by a separating means in optical paths and incident respectively to the surface of the photosensitive member.

Also the above object can be attained by an information recording optical system comprising a light source for generating a plurality of light beams in parallel, a single deflective device for scanning the plurality of light beams, and a focusing optical system wherein the focusing for focusing the light beams, optical system is arranged in parallel corresponding to each light beam.

Where the focusing optical system represents an optical system including a lens, a mirror and the like for focusing the light beams after passing through the deflection device onto the recording member.

Another object of the invention is to provide a color image forming apparatus wherein relatively little labor is required for installing or detaching all developing devices and means for installing or detaching the developing devices is of relatively small size and light weight and can be conveniently treated, and further the color image can be formed in a relatively short time.

The above object of the invention can be attained by a color image forming apparatus wherein developing devices being 3-4 in number and detachably installed and an electrostatic image forming means are arranged around a photosensitive drum, an electrostatic image formed on the photosensitive drum by the electrostatic image forming means is developed by the developing devices into toner images, and the process is repeated thereby a color image composed of the toner images is formed on the photosensitive means, characterized in that two adjacent developing devices among one set in the case of three developing devices and among two sets in the case of four developing devices are enclosed in one case and can be installed and detached together with the case, and that the electrostatic image forming means can form the electrostatic images at two positions, i.e., at upstream side of the developing device arrangement and at intermediate position of the developing device arrangement.

Also the above object of the invention can be attained by a color image forming apparatus wherein an electrostatic image forming means and developing devices being three or four in number are arranged around an image retainer, an electrostatic image formed on the image retainer by the electrostatic image forming means is developed into toner images by the developing devices, and the process is repeated thereby a color image composed of the toner images is formed on the image retainer, characterized in that the electrostatic image forming means forms the electrostatic images at two positions, i.e., on upstream side of the developing device arrangement and between one developing device and two developing devices or between two developing devices and two developing devices, one developing device and two developing devices or two developing devices and two developing devices are driven respectively by separate drive sources, and every two developing devices are driven through a changing means by a common drive source so that drive timing of one developing device and other developing device is shifted during about one rotation of the image retainer.

Other and further objects and features of the invention will appear more fully from the following description of the drawings.

BRIEF DESCRIPTION OF THE DRAWINGS

FIGS. 13 and 14 are time charts of image forming;

FIG. 19 is a schematic side view illustrating constitution of an image forming apparatus as another embodiment of the invention;

FIG. 20 is a partial plan view of FIG. 19;

FIG. 21 is a perspective view illustrating another example of an optical system composing two sorts of laser rays;

FIG. 22 is a graph illustrating spectral characteristics of a multilayer film plate;

FIG. 23 is a schematic constitution view of a color image forming apparatus as another embodiment of the invention;

FIG. 24 is a schematic constitution view of an information recording optical system as another embodiment of the invention;

DESCRIPTION OF THE PREFERRED EMBODIMENTS

Figure 1A:
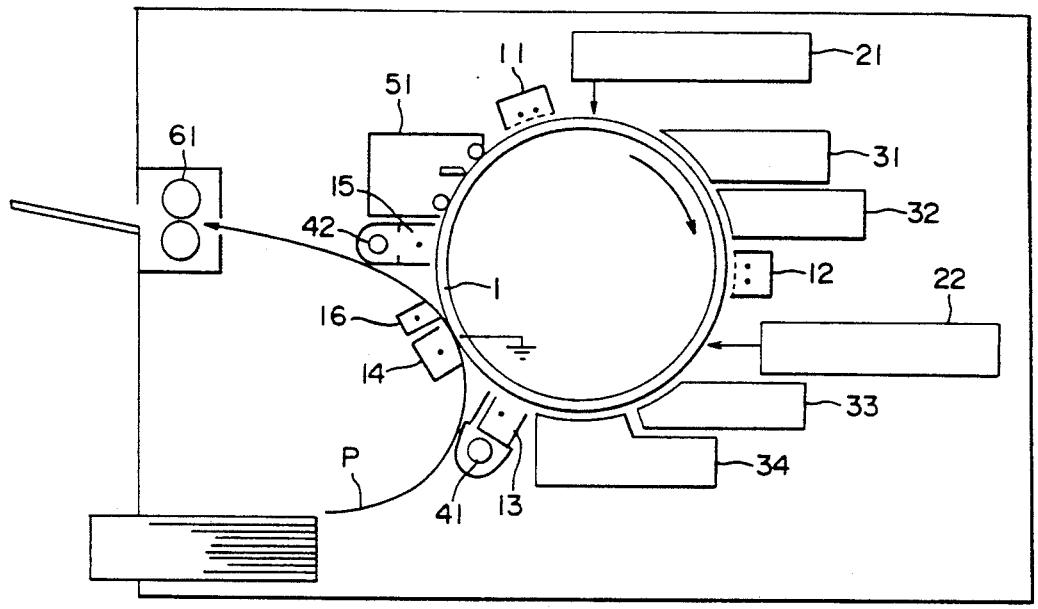
FIGS. 1A and 1B are schematic constitution views of an image forming apparatus.

In a recording apparatus of FIG. 1A, numeral 1 designates a drum-shaped image retainer having a photoconductive photosensitive member surface layer such as Se and rotating in arrow direction, numerals 11, 12 designate charging devices for uniformly charging the surface of the image retainer 1, numerals 21, 22 designate image forming devices of respective colors of a color image, numerals 31~34 designate developing devices respectively using toners of different colors, such as yellow, magenta, cyan and black, as developers, numerals 13 and 41 designate a charging device before transfer and an exposing lamp before transfer respectively to be installed if necessary in order that a color image formed by superposing of a plurality of color toner images on the image retainer 1 is easily transferred onto a transfer member P or in order that the transfer member P is easily separated, numeral 14 designates a transfer device, numeral 61 designates a fixing device for fixing the toner image transferred on the transfer member P, and numerals 42, 15 designate a charge eliminating lamp and a charge eliminating corona discharger respectively, and either one or combination of both devices may be used. Numeral 16 designates a charge eliminating electrode for separation, and numeral 51 designates a cleaning device for contacting with the surface of the image retainer 1 after transfer of the color image and for removing the residual toners on the surface, and having a cleaning blade and a fur brush to be separated from the surface of the image retainer 1 before arriving of the surface subjected to the first developing.

Figure 4A:
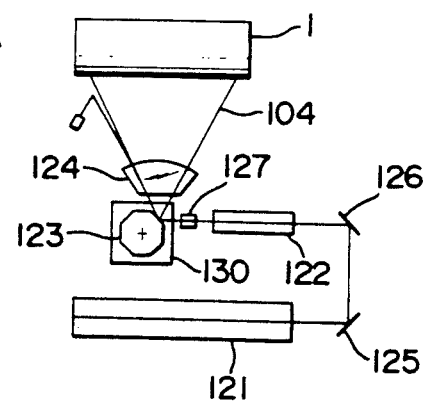
FIGS. 4A-4C are schematic constitution views of a laser beam scanner for image exposing.
Figure 4B:
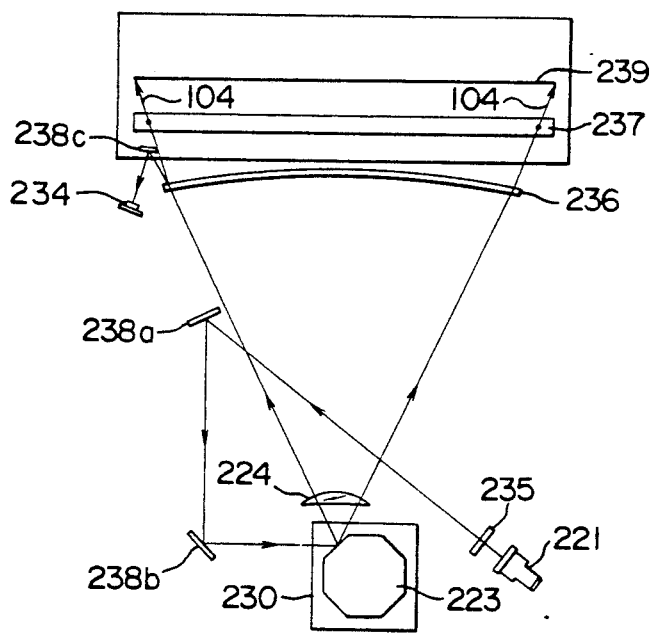
Figure 4C:
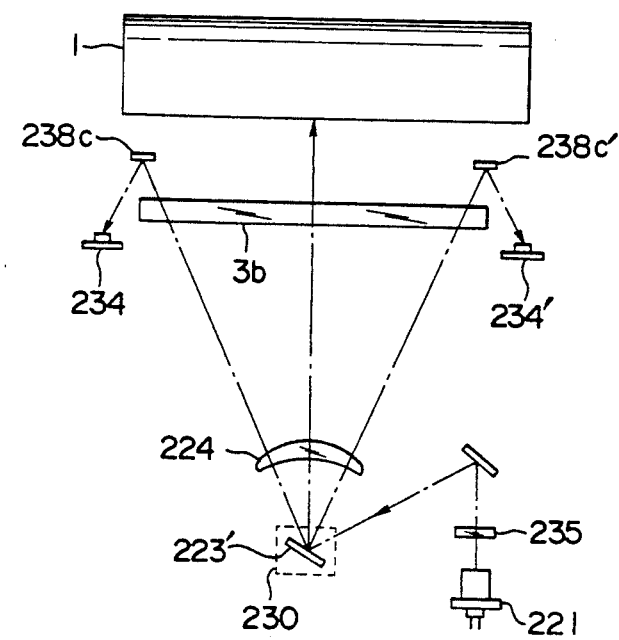

In the charging devices 11, 12, particularly in those for charging in superposed manner on the surface of the image retainer 1 already charged, it is preferable to use a scorotron corona charger as shown in the figure where influence of the previous charging is little and the stable charging can be given. Also in this recording device using the drum-shaped image retainer 1, the image forming devices 21, 22 may be those in an ordinary monocolor electrophotographic copying machine where slit exposures are filtered per each color by filters. However, in order to record the clear color image, that shown in FIGS. 4A~4C is preferable where image forming is performed by a laser beam scanner and the obtained latent image is developed in reversal development. If the laser beam scanner as shown in FIGS. 4A, 4B is used for forming the image exposure 104, the electrostatic images of respective colors can be easily formed in shifted state as hereinafter described, thereby the clear color image can be recorded.

In the laser beam scanner of FIG. 4A, laser beam generated from a laser 121 such as He-Ne laser is rendered ON/OFF by an acoustic/optical modulator 122 and deflected by a mirror scanner 123 composed of a rotary polygon mirror of octahedron shape rotated by a driving motor 130, and passes through a focusing f−θ lens 124 and is formed into an image exposure 104 scanning on the surface of the image retainer 1 at constant speed. Numerals 125, 126 designate mirrors, and numeral 127 designates a lens which makes proper the diameter of the incident beam to the focusing f−θ lens 124 so that the beam is irradiated at the proper diameter onto the image retainer 1. A laser beam scanner having structure as shown in FIG. 4B is also preferable. Laser beam generated from a semiconductor laser 221 is scanned in rotation by a polygon mirror 223 rotated by a driving motor 230, and passes through an f−θ lens 224 and is deflected in its optical path by a reflecting mirror 237 and then projected onto the surface of the image retainer 1 so as to form a bright line 239. Numeral 234 designates an index sensor to detect the beam position for control of the scanning starting, and numerals 235, 236 designate cylindrical lenses to correct the slant angle. Numerals 238a, 238b, 238c designate reflecting mirrors to constitute the beam scanning optical path and the beam detecting optical path. When a laser beam scanner as described in Japanese patent application No. 61-239469 filed by the present applicant and an optical deflector 223' by etching an insulation plate, for example, a crystal plate is used, reciprocating scanning becomes possible being different from the scanning by the rotary polygon mirror. When the reciprocating scanning is adopted, the optical scanning system having constitution as shown in FIG. 4C may be used.

That is, index sensors 234, 234' are arranged respectively in forward and backward directions of the scanning direction, thereby the scanning starting of the laser beam and the scanning finishing (may be said also the scanning starting because of the beam return) can be detected and therefore the corresponding image information can be recorded on the image retainer 1.

In FIG. 4C, numerals 238c, 238c' designate reflecting mirrors.

If the scanning is started, the beam is detected by the index sensor 234 and modulation of the beam by first color signal is started by a modulating portion (not shown). The modulated beam is scanned on the image retainer 1 previously charged uniformly by the charging device 11 or 12. Latent image corresponding to the first color is formed on the drum surface according to the main scanning by the laser beam 104 and the auxiliary scanning by rotation of the image retainer 1.

The image exposure 104 is not limited to the dot exposing by the laser beam as above described, but that obtained using, for example, LED, CRT, liquid crystal or optical fiber transmission member may be used. Also the image retainer may be a belt-shaped recording apparatus.

Figure 2:
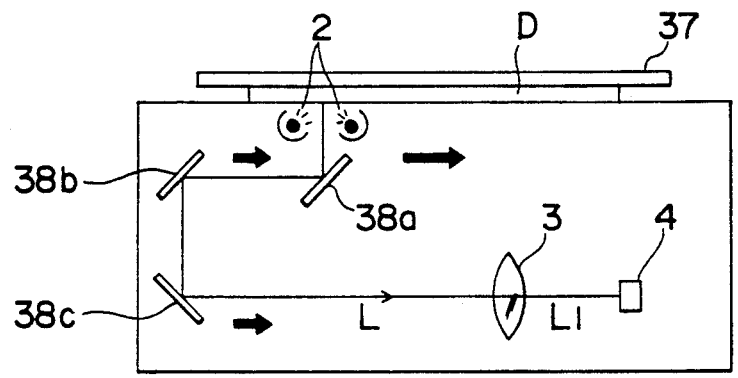
FIG. 2 is a schematic constitution view of an image read device.

In an image read device of FIG. 2, numeral 37 designates an original pushing plate for closely contacting the document D with a document glass plate, and numerals 38a, 38b, 38c designate reflecting mirrors which reflect light L at image exposing onto the document D by an exposing lamp 2, and the light L reflected by the reflecting mirror group is condensed by a lens 3 and irradiated onto a one-dimensional image sensor 4 and converted into electric signals. The arrow indicates direction of the light source 2 and the mirror group 38a, 38b, 38c to be moved for the auxiliary scanning. The light $L_1$ condensed by the lens 3 projects the contracted image onto the surface of the CCD image sensor 4 having a mosaic filter layer 42' of B, G, R of FIG. 3. The light $L_1$ is sensed by sensor elements 41' closely arranged in one dimension on the CCD image sensor 4 and subjected to photoelectric conversion, and electric signal obtained by the photoelectric conversion is driven by two-phase drive pulse 43 $\theta 1$, $\theta 2$ at a speed corresponding to pulse frequency of the transfer gate pulse 44 and scanned in the main scanning within a transfer portion (CCD shift register) 45 in the arrow X direction and outputted to an output 46. Output signal obtained here is inputted through signal system of an image forming system of FIG. 11 as hereinafter described to a modulator of a laser beam scanner of FIG. 4. As a color read device, a method where color separation in three colors is performed by means of a dichroic mirror and then each separated color is incident to the CCD or a method of optical scanning of the document by a color contact image sensor may be used.

Figure 5:
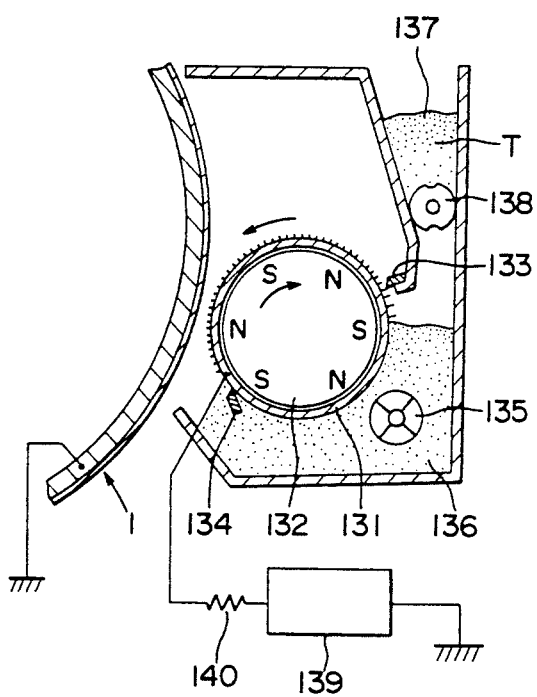
FIG. 5 is a sectional view of main part of a developing device.

Also as the developing devices 31~34, that having structure as shown in FIG. 5 may be preferably used.

In FIG. 5, numeral 131 designates a developing sleeve made of non-magnetic material such as aluminium or stainless steel, numeral 132 designates a magnet member installed within the developing sleeve 131 and having a plurality of magnetic poles in the circumferential direction, numeral 133 designates a layer thickness regulating blade formed on the developing sleeve 131 for regulating the thickness of the developer layer, numeral 134 designates a scraper blade for removing the developer layer after developing on the developing sleeve 131, numeral 135 designates a stirring rotary body for stirring the developer in a developer reservoir 136, numeral 137 designates a toner hopper, and numeral 138 designates a toner supply roller which is provided on a surface with a recess for toner entering and supplies toners from the hopper 137 to the developer reservoir 136, numeral 139 designates a power source which applies bias voltage including an oscillating voltage component depending on the case through a protective resistor 140 to the developing sleeve 131 so as to form the electric field to control movement of toners between the developing sleeve 131 and the image retainer 1. In the figure, although the developing sleeve 131 and the magnet member 132 are rotated respectively in the arrow directions, the developing sleeve 131 may be fixed or the magnet member 132 may be fixed, or the developing sleeve 131 and the magnet member 132 may be rotated in the same direction. When the magnet member 132 is fixed, in order that the flux density of the magnetic pole opposed to the image retainer 1 becomes larger than that of other magnetic pole, the magnetization is strengthened or two magnetic poles of equal polarity or opposite polarity are closely arranged thereto. In such developing device, the magnetic pole of the magnet member 132 is magnetized usually in the flux density of 500~1500 gauss, and the developer in the developer reservoir 136 is attached to the surface of the developing sleeve 131 by the magnetic force, and the attached developer is regulated in its thickness by the layer thickness regulating blade 133 and forms the developer layer. The developer layer is moved in the same direction or reverse direction with respect to the rotation arrow direction of the image retainer 1 (the same direction in the figure), and the developing sleeve 131 develops the electrostatic image of the image retainer in the developing region where the surface of the developing sleeve 131 is opposite to the surface of the image retainer 1, and the residual toner is removed from the surface of the developing sleeve 131 by the scraper blade 134 and returned to the developer reservoir 136. Regarding the developing, at least for the second developing or later, which is repeated for superposed of the color toner images, a non-contact developing condition is preferable so that toners adhering to the image retainer 1 during the previous developing are not slipped in the later developing. The non-contact developing means is a developing system where the developer layer on the developing sleeve 131 is separated from the image retainer 1 at non-applied state of the developing bias, and the superposition bias of DC and AC is applied to the developing sleeve 131 and toners are flown under the AC electric field and adhere to the image retainer 1.

FIG. 5 shows a developing state according to the non-contact developing condition.

Further in the developing devices 31~34, it is preferable to use so-called two-component developer constituted by mixing of non-magnetic toner and magnetic carrier, where the toner need not contain black or brown magnetic substance and the toner with clear color can be obtained and the charging control of toner is possible. Particularly the magnetic carrier is preferably composed of a resin such as styrene resin, vinyl resin, ethylene resin, rosin modified resin, acrylic resin, polyamide resin, epoxy resin, polyester resin, and fine powders of ferromagnetic material or paramagnetic material, such as ferrosoferric oxide, $\gamma$-ferric oxide, chromium dioxide, manganese oxide, ferrite, manganese-copper alloy, is dispersed and contained in the resin, or otherwise surface of powders of the magnetic substance is coated by the above-mentioned resin. The magnetic carrier thus constituted is an insulation carrier having resistivity of $10^8$ $\Omega$cm or more preferably $10^{13}$ $\Omega$cm or more. If the resistivity is low, when the bias voltage is applied to the developing sleeve 131, charge is injected in the carrier particle and the carrier particle is liable to adhere to the surface of the image retainer 1, or the bias voltage is not sufficiently applied. Particularly, if the carrier adheres to the image retainer 1, the tone of the color image is adversely affected.

The resistivity is a value obtained in that particles are entered in a container with sectional area of 0.50 cm$^2$ and tapped, and then a load of 1 kg/cm² is applied to the particles, and a voltage is applied so that the electric field of 1000 V/cm is produced, between the load and the bottom electrode, and then the current value in this state is read.

When the average particle diameter of the carrier is less than 5 μm, the magnetization becomes too weak, and when it becomes over 50 μm, the image cannot be improved and breakdown or discharge is liable to occur and therefore high voltage cannot be applied. Consequently, the average particle diameter is preferably more than 5 μm and less than 40 μm, and if necessary, fluidizing agent such as hydrophobic silica may be suitably added as additive.

The toner is preferably constituted by a resin with various pigments and if necessary a charging control agent added therto, having average particle diameter 1~20 μm, and the average charging amount is 3~300 μc/g preferably 10~100 μc/g. If the average particle diameter of the toner is less than 1 μm, separation from the carrier becomes difficult, and if it becomes more than 20 μm, the resolving power of the image is deteriorated.

When the above-mentioned developer of the insulation carrier and the toner is used, the bias voltage to be applied to the developing sleeve 131 of FIG. 5 can be set easily without fear of leak so that the toner adheres sufficiently to the electrostatic image and fog is not produced. In order that the developing moving control of the toner by application of the bias voltage can be performed more effectively, the toner may contain magnetic substance as used in the magnetic carrier in range not to deteriorate the color clearness of the toner.

Constitution of the developing device and the developer to be preferably used in the method of the invention has been described. However, the invention is not limited to this, but a developing device or a developer as disclosed in Japanese Pat. Laid Open Nos. 50-30537, 55-18656~18659, 56-144452, 58-116553~116554 may be used. Further, as disclosed in Japanese Pat. Laid Open Nos. 58-57446, 58-96900~96903, 58-97973, 60-192710~11, 60-14537, 60-14539, 60-176069 previously filed by the present applicant, non-contact developing condition by a two-component developer is more preferable. Particularly in the developing device disclosed in the Japanese Pat. Laid Open No. 60-176069, since the magnet member within the developing sleeve is fixed and the developing is performed at portion of the thin developer layer between the magnetic poles, the developing gap can be narrowed and therefore the developing electric field can be made sufficiently large and high developing performance can be obtained. That the magnet member need not be rotated is also advantageous for constition of the apparatus, particularly for the image forming apparatus having a plurality of developing devices.

Image exposing each time must be performed at an exactly registered position on the image retainer, and the positioning of such image exposing can be easily and exactly performed by the position detection and the image exposing timing control using an index marker for registration (one or plural if necessary, not shown) installed on a definite position of the image retainer or a usual photo sensor where pulses of an encoder rotating together with the image retainer are detected per rotation of the image retainer, and the color slippage is not produced in the obtained image.

Also in the case of the laser optical system, the position control method according to Japanese Patent Laid Open Nos. 56-161566, 57-64718, 59-53866 as optical scanning means serving also as a polygon, method of forming plural laser beams by a polygon according to Japanese Pat. Laid Open No. 60-150066, or method of forming plural laser beams according to an optical modulator may be used, thereby the image slippage can be prevented exactly.

In the recording method as above described, since the toner image formed on the image retainer 1 is transferred without using a transfer drum but directly to the transfer member P from the image retainer 1 by a transfer device 14, the color slippage is not produced and the apparatus can be made compact.

According to the recording device as above described, the method of the invention as shown in FIGS. 6 through 9 can be performed. FIGS. 6 through 9 indicate all the processes until the step where the second developing is performed.

Figure 6:
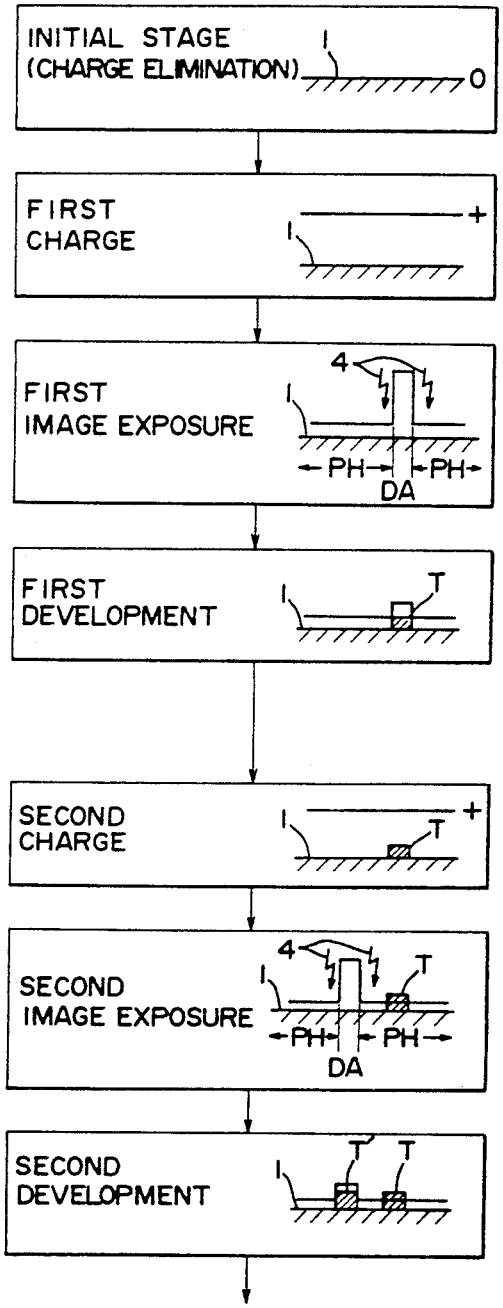
FIGS. 6, 7, 8 and 9 are flow charts illustrating process of image forming.

FIG. 6 indicates an embodiment of the invention where an electrostatic image is formed by an electrostatic image forming method in which the image exposing portion becomes background pH and the non-exposing portion becomes the electrostatic image DA and the developing is performed by adhering of the toner charged to the opposite polarity with respect to the electrostatic image. According to the recording device of FIG. 1A, a surface of the image retainer 1 is at the initial state where charge is eliminated by the charge eliminating device 15, 42 and cleaning is performed by the cleaning device 51 and its potential becomes 0, the first charging is applied uniformly by the charging device 11 at one rotation, the first image exposing is performed to the charged surface so that potential of the portion except for the electrostatic image becomes approximately 0 by the exposing image of respective colors, the first developing is performed to the electrostatic image where the potential obtained by the exposing is nearly equal to the potential of the first charging by the developing device using the developer of color toner corresponding to the exposing image among the developing devices 31~32, and the toner T charged to the opposite polarity adheres thereto.

The second charging is performed again uniformly by the charging device 12, the second image exposing is performed to the charged surface by the image exposing 22 regarding different color from the previous exposing so that potential of the portion except for the electrostatic image portion becomes approximately 0, and the second developing by toner T' is performed to the electrostatic image obtained in the exposing by any of other developing devices 33~34 using the developer of color toner corresponding to the image exposing.

Next, the processing device before transfer 13, 41, the transfer device 14, the charge eliminating device 15, 42 and the cleaning device 51 do not act, and the electrostatic image forming and the third and forth developing processes are repeated at the second rotation. When the fourth developing is performed and the color image by superposing of color toner images is formed, the charging device 13 before transfer and the exposing lamp 41 before transfer act before the passing of the color image. Next, the color image is transferred by the transfer device 14 to the transfer member P fed in synchronization with rotation of the image retainer 1, and the transferred color image is fixed to the transfer member P by the fixing device 61. The surface of the image retainer 1 to which the color image is transferred is charge-eliminated by the charge eliminating device 15, 42 and cleaned by the cleaning device 51 thereby the process is returned to the initial state, thus 1 cycle of the color image recording in the embodiment of the invention is completed. That is, charging for the image forming of each time is performed two times by the charging devices 11, 12 respectively, and the image exposing is also performed two times, for example, by two exposing devices made by the second laser beam scanner, thereby the recording device can be constituted to small size at low cost and the recording at high speed can be performed.

In the embodiment of FIG. 6, since developing is performed by the developing method where the developing is performed by the toner charged to the the opposite polarity as the electrostatic image, the developing density of each color can be easily raised and therefore the clear color image can be easily recorded. Since the potential remains in the previous toner image and mixing of colors is liable to occur, in order to avoid the color mixing, the DC bias in the developing may be set to higher value in sequence at later time. Corresponding to this, the charging potential may be set higher in sequence. Also means to put the polarity of toners in order is required during the transfer.

Figure 7:
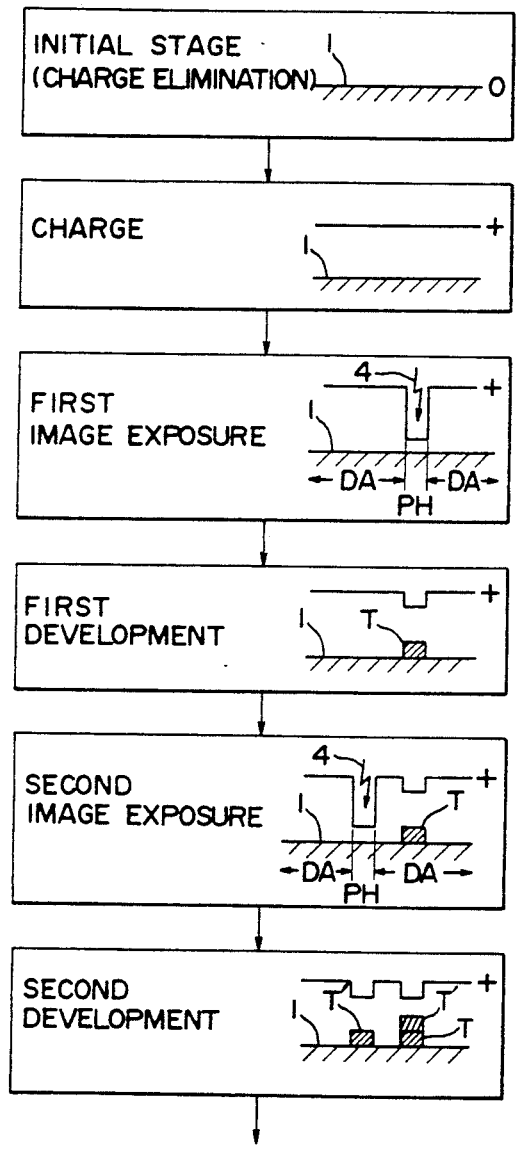
Figure 8:
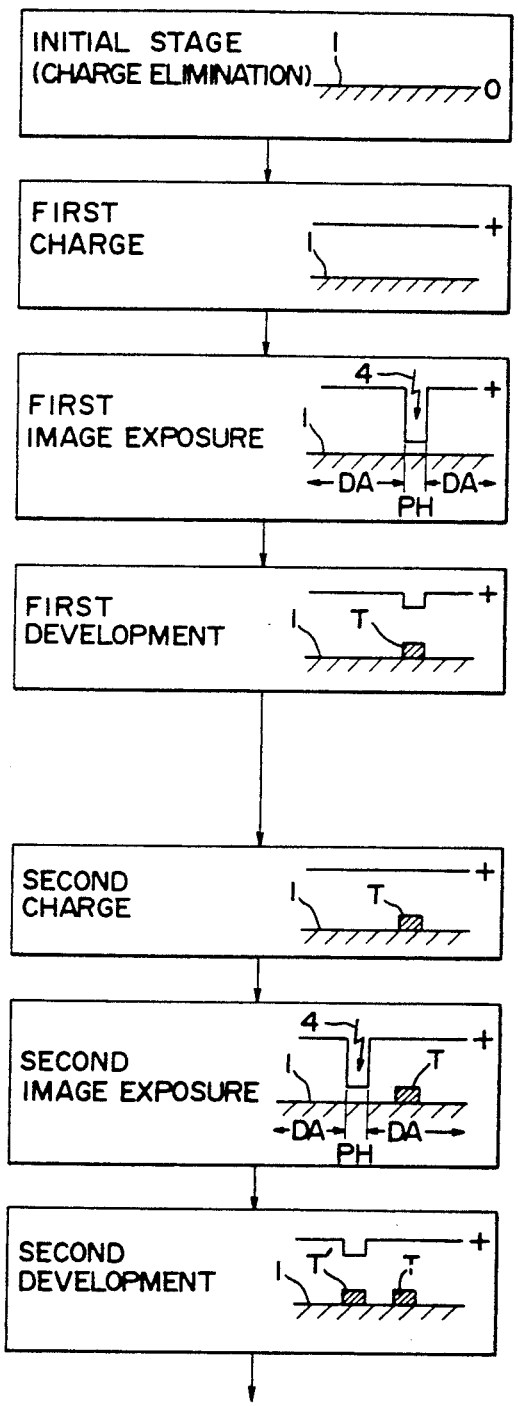
Figure 9:
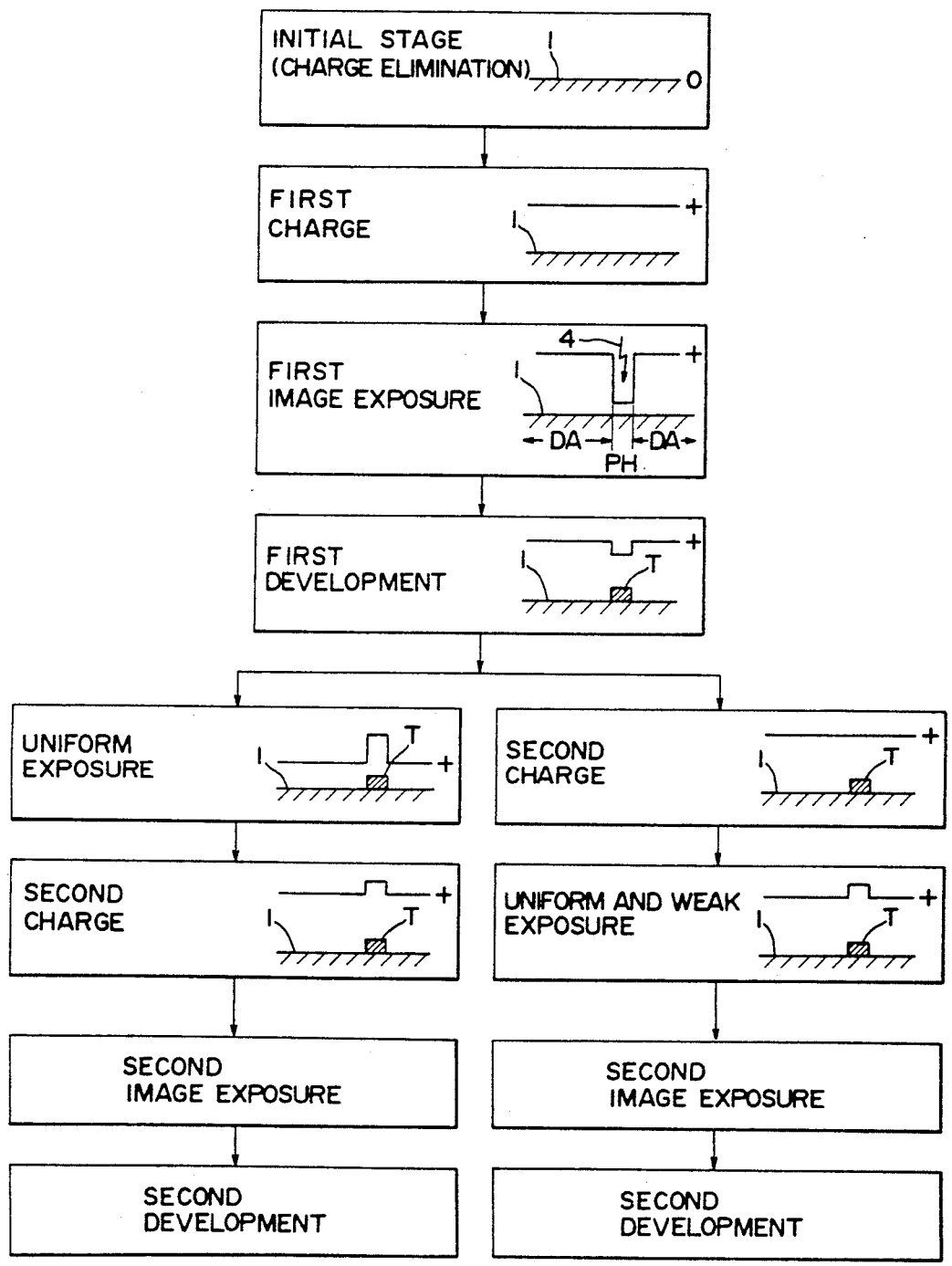
Figure 10:
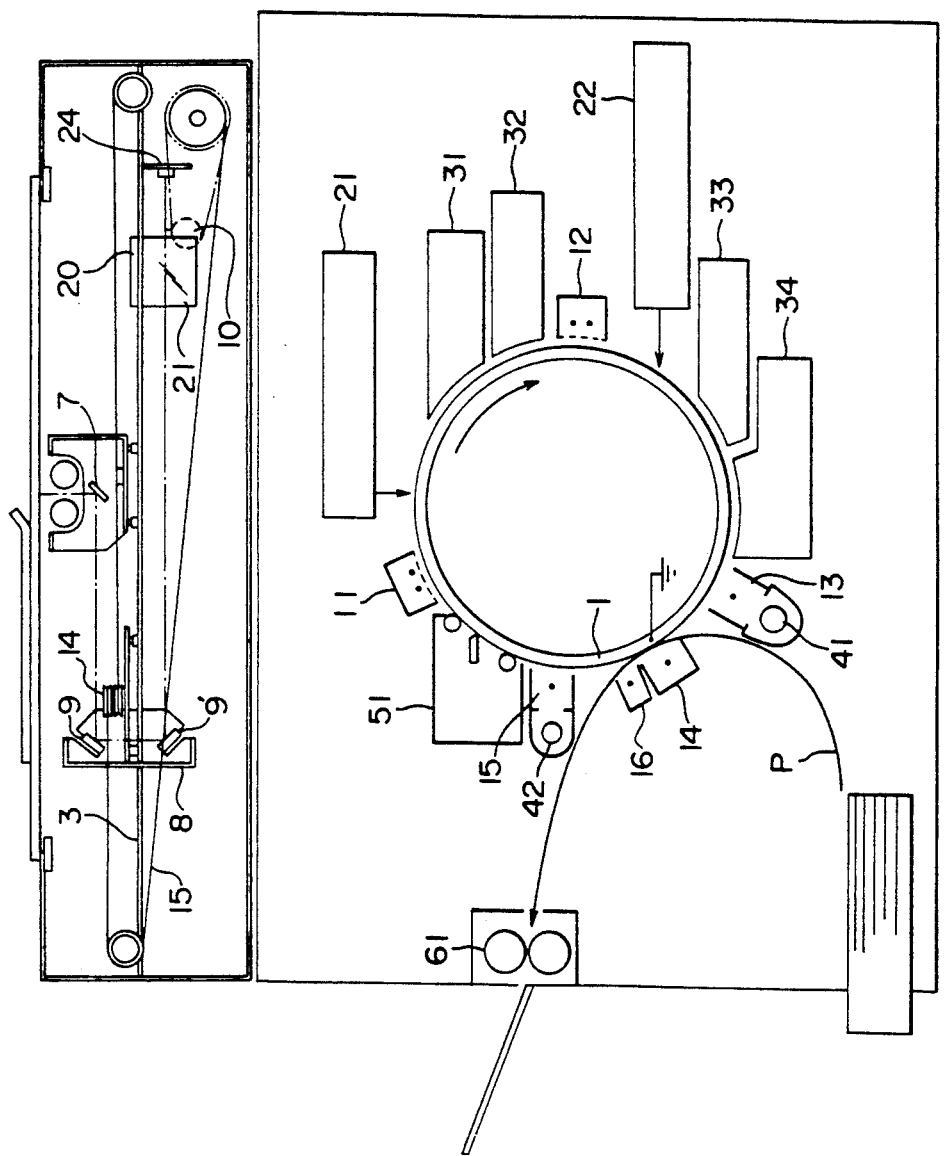
FIG. 10 is a schematic constitution view of an image forming apparatus.

FIGS. 7 through 9 indicate an embodiment of reversal development of the invention where the electrostatic image is formed by the electrostatic image forming method in which the image exposing portion of the electrostatic image has a lower potential than that of the background, and the developing is performed by the toner charged to the same polarity as that of the background potential of the electrostatic image.

In the embodiment of FIG. 7 according to the recording device of FIG. 1A, on a surface of the image retainer 1 at the same initial state as that of FIG. 6, the charging is applied uniformly by the charging device 11 at one rotation, the first image exposing is performed to the charged surface by projecting the exposing image per color by the laser bean scanner of FIG. 4 so that the potential of the electrostatic image portion becomes approximately 0, the first developing is performed to the obtained electrostatic image by the developing device using the developer of color toner corresponding to the exposing image (in this case, the developer where the toner is charged to the same polarity as that of the image retainer 1 being different from the example of FIG. 6) among the developing devices 31~32. The charging devices 11, 12 are not used at later latent image forming, and the second image exposing is performed by the laser beam scanner projecting the image exposing 22 regarding different color at a position shifted from the projecting position of the previous exposing image or at the same position, and the second developing is performed to the electrostatic image obtained in the exposing and having the potential approximately 0 by any of other developing devices 33~34 using the developer of color toner corresponding to the image exposing. The electrostatic image forming and the developing at third and fourth are repeated at the second rotation, and then 1 cycle of the color image recording is completed in a similar manner to that described regarding FIG. 6. In this example, when the electrostatic image having the potential of approximately 0 is developed and the toner T charging to the same polarity as the charging of the image retainer 1 adheres to the image, the potential does not become nearly equal to the potential of the background portion as shown in the figure. Consequently, at the developing of the toner T' of different color adhering to the electrostatic image formed later, although the exposing, i.e., the writing is not performed to the electrostatic image portion to which the toner T previously adheres, the toner T' adheres superposing thereto. Accordingly, utilizing the point that toners of different colors are easily superposed, monocolor image or multicolor image being excellent in clearness can be obtained.

In an example of FIG. 8, when developing is performed subsequently at position of the electrostatic image previously developed, in order to prevent the color mixing due to adhering of the previous toner of different color even if the amount is little, the recharging and smoothing are performed, on the contrary to the example of FIG. 7 to form the electrostatic image actively in superposing on the position of the electrostatic image previously formed. In the example of FIG. 8, process from the initial state to the first developing is similar to that to the first developing in FIG. 7. Subsequently, being different from the example of FIG. 7, the second charging is performed uniformly again by the charging device 12, the second image exposing is performed to the charged surface, the second developing is performed, and then the electrostatic image forming and the third and forth are repeated similarly. In the example of FIG. 8 where after the previous developing, the surface of the image retainer 1 is charged uniformly again and the subsequent electrostatic image forming and developing are performed, similarly to the example of FIG. 6, the electrostatic image can be formed in superposing on the position of the electrostatic image previously formed, and as long as the exposing is not performed at the image position of adhering of the previous toner, the subsequent toner of different color scarcely adheres.

Figure 1B:
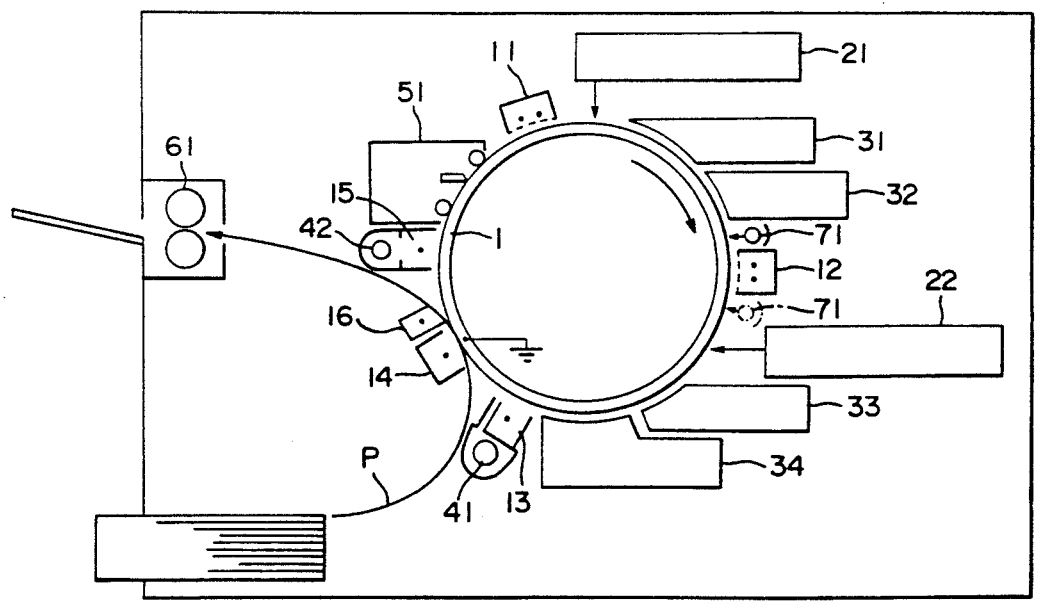

In an example of FIG. 9, subsequent toner of different color is particularly prevented from adhering to the image position of adhering of previous toner. In this example, the process to the first developing is similar to that to the first developing in FIG. 8. After the first developing, as shown in FIG. 1B, the surface of the image retainer 1 is exposed uniformly using an exposing lamp 71, subsequently the second charging is performed uniformly using the charging device 12, or the second charging is previously performed uniformly using the charging device 12 and then the weak uniform exposing is performed using an exposing lamp 71 shown by an imaginary line. Next, the second image exposing and the second developing are applied, and then the electrostatic image forming and the third and forth are developing repeated similarly. After the developing, if the uniform exposing is performed previously, the photosensitive member including the toner adhering portion by developing is uniformly exposed and therefore becomes the potential of approximately 0. If the second charging is applied thereto, the potential difference becomes less between the toner adhering portion and other portion for next electrostatic image forming, thereby the surface of the image retainer 1 can be uniformly charged. The favorable result is given also to the photosensitive member having the optical memory. After the developing, if the second charging is previously applied so as to charge the surface of the image retainer 1 uniformly and then the uniform weak exposing is applied, the charging state of the surface of the image retainer 1 with toner adhering has the high potential in comparison to the case without toner adhering.

Consequently, when the subsequently formed electrostatic image is developed, potential of the previous toner adhering portion is smoothed or high, adhering of toner of different color to the portion can be prevented effectively.

In any of the examples as above described, it is preferable that the developer in mixing of toner and insulation carrier is used in the developing devices 31~34, and the developing is performed under the non-contact developing condition. Thereby mixing of toners of different colors can be prevented as already described. Moreover, since the bias voltage suitable for the toner control can be easily applied to the developing sleeve 131 of the developing device, in the case of the electrostatic image forming method and the developing method in the examples of FIGS. 7 through 9 where the image exposing device such as the laser beam scanner is used advantageously, the color image with high developing density and excellent clearness can be recorded.

Next, outline of a color image forming system according to the invention will be described referring to FIG. 11. The image forming method uses the process of FIG. 8. The recording device, the dot pattern memory and the image forming process are controlled and driven by control signal from the CPU, and as the exposing system of FIG. 2 for example (lamp 2, mirrors 38a, 38b, 38c) is moved, the CCD image sensor 4 as the color scanner reads the color information of B, G, R in lateral direction of the document D, and outputs the analog video signal. This signal is subjected to the shading correction so as to eliminate distortion due to the color information after the A/D conversion and the optical system, and temporarily inputted in the buffer memory in correspondence of each of B, G, R to the same image position.

Figure 3:
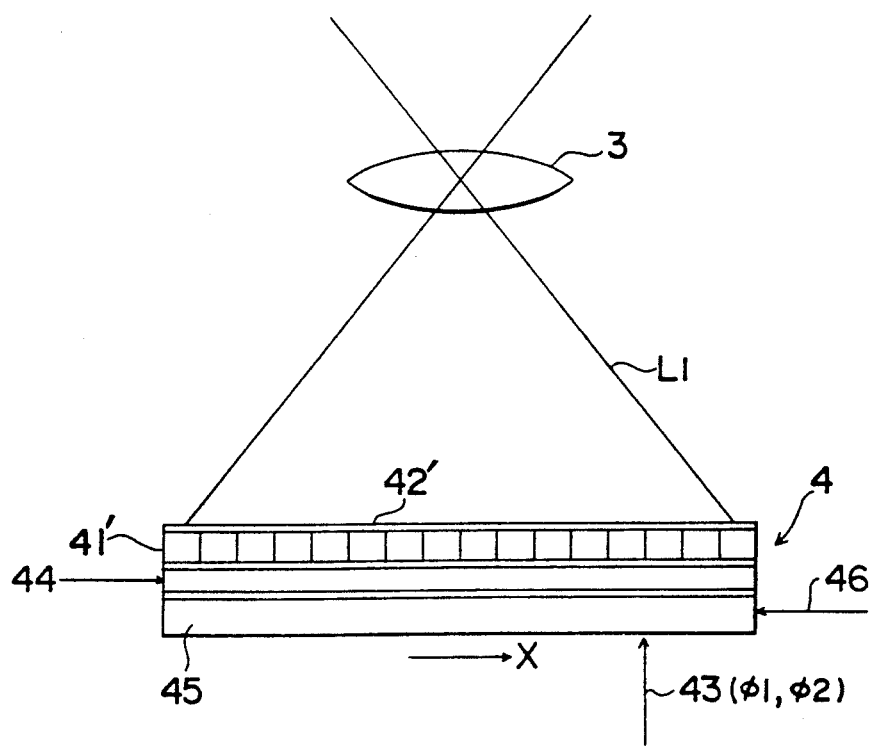
FIG. 3 is a view illustrating a line image sensor of CCD to perform image reading.

Although FIG. 3 shows the CCD color image sensor, a contact color image sensor also may be used.

Figure 16:
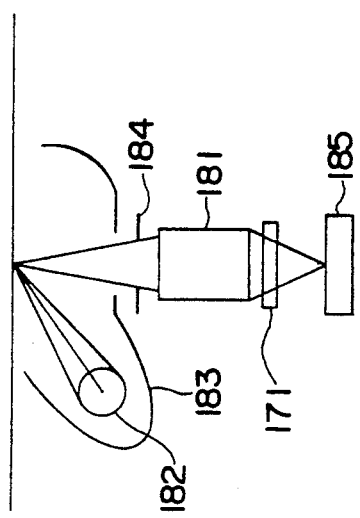
FIG. 16 is a graph illustrating spectral characteristics of a notch filter.
Figure 17:
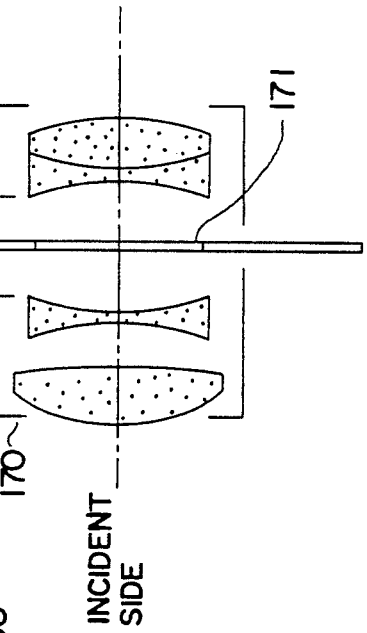
FIG. 17 is a constitution view of a notch filter installed in a lens system.
Figure 18:
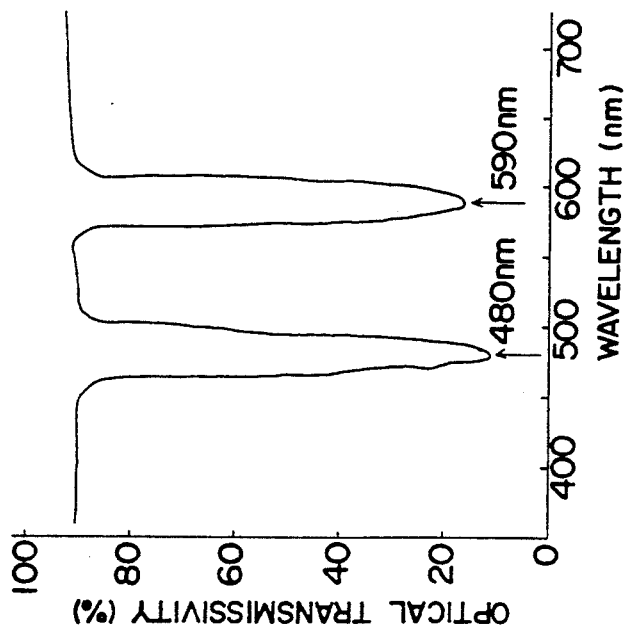
FIG. 18 is a schematic constitution view of an image reading device using a light converging element.

In order to improve the color separation characteristics of the color separation filter, a notch filter may be installed to cut light between B and G between G and R. An interference filter is preferably used as notch filter, and ,for example, a notch filter having spectral characteristics as shown in FIG. 16 is used. The notch filter 171 is set at front and rear sides of a lens system or between lenses in the lens system 170 as shown in FIG. 17, and at front and rear sides of an optical converging element in a contact color image sensor. FIG. 18 shows an image read device using an optical converging element 181. In FIG. 18, numeral 182 designates an exposing lamp for exposing an image, numeral 183 designates a reflecting mirror, numeral 184 designates a slit, and numeral 185 designates a contact image sensor. B. G. R signals from the buffer memory are subjected to complementary correction into Y. M. C and gradation correction is made, and then extraction of black component (UCR) from each data is performed and extraction into chromatic color component and achromatic color component is performed. The Y. M. C as chromatic color component is subjected to color correction and subjected to gradation correction together with the black component (BK), and then inputted into a pattern generator (PG). Here the signal is converted into, for example, digital dot pattern signal based on the dither method, and stored in a page memory per each color. These image data are outputted in synchronization with rotation of the image retainer through a line memory required as the buffer to the recording device, and writing and image forming are performed. In FIG. 11, at first rotation of the image retainer, through a selector for selecting color information, M dot pattern and Y dot pattern after passing through a delay circuit for assuring between two image forming means are outputted from a first latent image forming means and a second latent image forming means respectively. When the image retainer at second rotation comes to the same position, C dot pattern and BK dot pattern are outputted in matching with the write timing from the page memory from the first latent image forming means and the second latent image forming means respectively.

Figure 11:
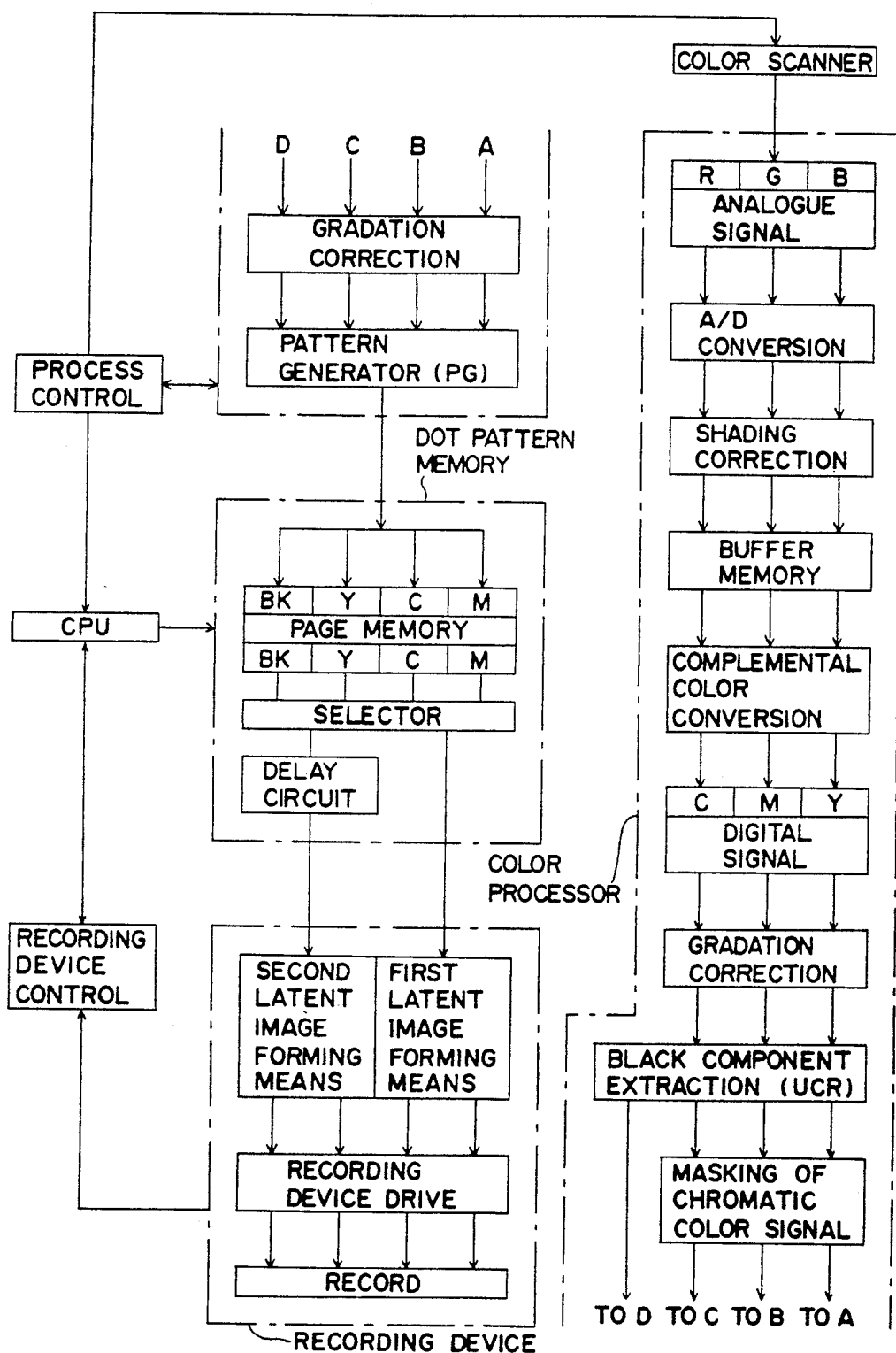
FIGS. 11 and 12 are circuit constitution diagrams of image forming.
Figure 12:
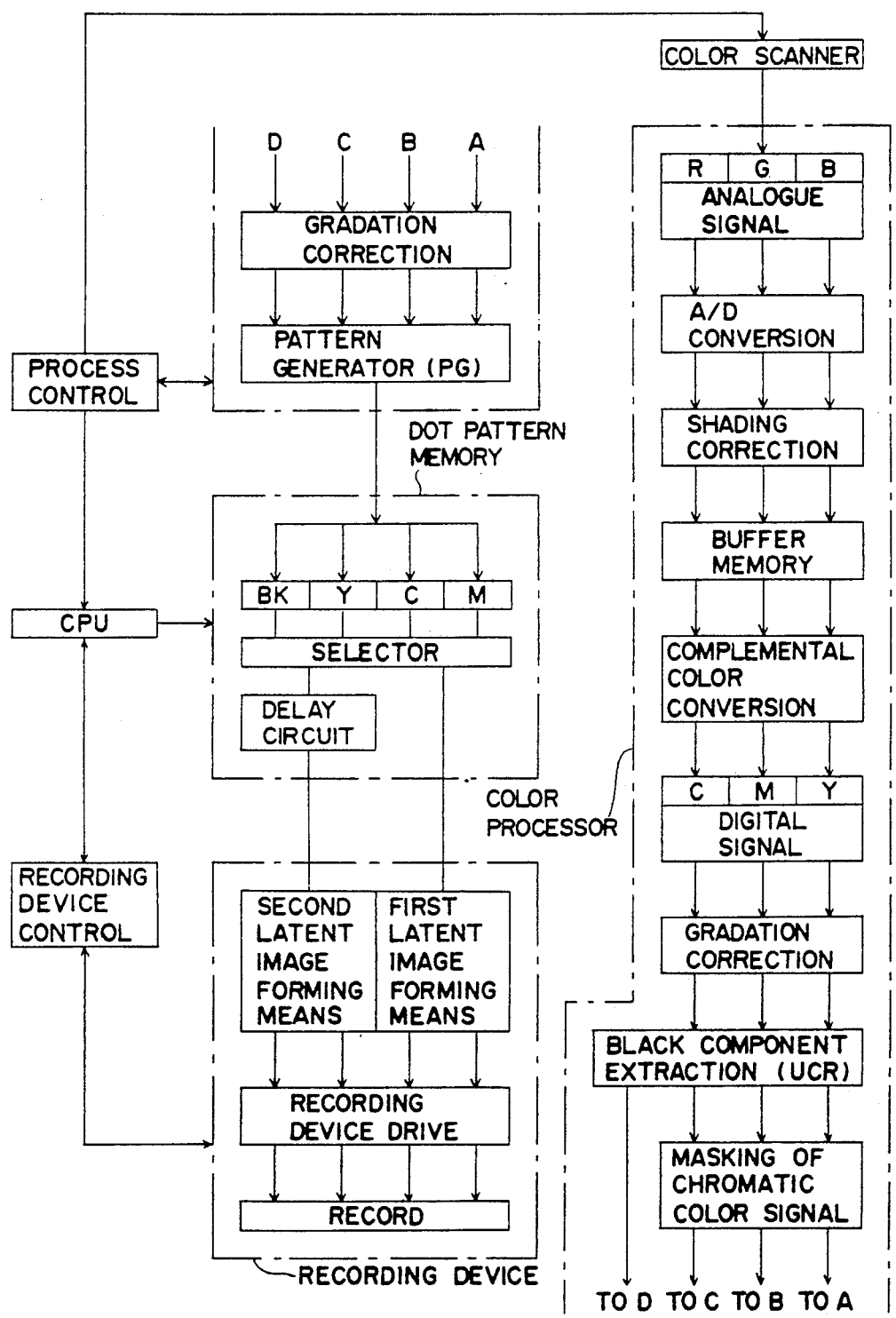

In FIG. 12, the image memory is significantly reduced. Similarly to FIG. 11, the image data are inputted to the pattern generator (PG) according to the first scanning by the color scanner. Here the data are converted into (,) for example, digital dot pattern signal based on the dither method. M dot pattern signal subjected to first writing passes through a line memory required as the buffer, and writing and image forming are performed nearly in synchronization with reading. On the other hand, Y dot pattern signal subjected to second writing passes through a delay circuit for assuring between two image forming means and outputted to a recording instrument. During next rotation of the image retainer, C dot pattern signal is taken in matching with the write timing according to the scanning by the color scanner again, and BK dot pattern signal is taken through the delay circuit in sequence. The color scanner is scanned in synchronization with rotation of the image retainer.

In FIGS. 11 and 12, the delay circuit means an image memory serving as a shift register. The image memory compensates difference of write timing produced between two image forming means.

In usual color mode, the developing device having color toner corresponding to the image data acts. Regarding the image forming device of FIGS. 1A and 1B, the developing devices 31, 32 having magenta toner and cyan toner correspond to the case of developing of the image data outputted without passing through the delay circuit, and the developing devices having yellow toner and black toner correspond to the case of developing of the image data outputted through the delay circuit. The image forming means 21 corresponds to the first image forming means, and the image forming means 22 corresponds to the second image forming means. The first and second latent image forming means differ in the recording position on the photosensitive drum. Consequently, sending timing of data from the delay circuit must be shifted exactly. Shift of the timing is determined by counting the first horizontal synchronous signals, and at attaining to specified number, the second image signals (color information) are transmitted. Other than such means, the shift can be set from rotating state and time of the drum according to the drum encoder or the like.

In the system described in FIG. 12, the read system must be reset at next write timing, and further the registration of the image on the image retainer is required. Since it is quite difficult to perform the registration by mechanical means, a line memory required as the buffer per each field is preferably provided. That is, for positioning of the document, moving time of the light source (document read starting time) and the moving position of the document glass plate or the light source or the document end position as reference position are read and stored in the buffer memory. On the other hand, as the write timing, signal corresponding to the M reference toner image position formed on the drum is detected and second writing or later is performed, thereby the registration of the image can be performed with high accuracy The superposed toner image is made to be easily transferred by action of the charging device 13 before transfer and the exposing lamp 41, and then transferred onto the transfer paper P supplied from the cassette by action of the transfer device 14, and the transfer paper P is separated by action of the separating electrode 16 and heated and fixed in the fixing device 61. Residual toner on the surface of the image retainer 1 after transfer is cleaned by the charge eliminating device 15 and the cleaning device 51 having the cleaning blade, and the image retainer 1 is ready for next image forming.

In the embodiment as above described, since dot pattern of each color is written in synchronization with the read image signal, the buffer memory is sufficient and a frame memory of large capacity is not required and the cost is significantly reduced.

Reference signals $E_{yl}$, $E_{ml}$, $E_{cl}$ and $E_{kl}$ are reference density patterns for the toner density control, the charging potential, the exposing intensity and feedback of the developing bias, and reproducibility of the color image is significantly improved.

FIGS. 13 and 14 are timing charts of the system described using FIGS. 11 and 12.

The color image forming apparatus can obtain any monocolor image or two-color image by one rotation of the image retainer.

As described in the process shown in FIG. 7, developing of plural times is performed to one latent image without recharging thereby monocolor image can be obtained. In this case, specific color separation component obtained by one scanning or its sum is used as image data and written using the image forming device 21 of FIG. 1, and developing is performed using the specific developing devices 31~34 selectively or at plurality, and transfer is performed. For example, in order to form monocolor image of green, developing is performed by Y toner and C toner. Then the charging device 12 and the image forming device 22 do not act. Of course, when the developing devices 33, 34 are operated, the charging device 12 and the image forming device 22 may be operated.

In the image read device, expression of two-color mode may be intended. For example, specific region in a black document may be expressed by M or C. In this case, specific color region is assigned by trimming, and image forming of the specific region by the image forming device 21, developing recharging of specific color by the developing devices 31 and 32, image forming of the specific region by the image forming device 22, and developing of the specific color by the developing devices 33, 34 are performed, thus the two-color image can be obtained by rotation of one reading scan and one image forming scan. Output data by the selector are distributed according to trimming region of the same black data, and outputted to the first latent image forming means and the second latent image forming means. In the case of M and black, charging and image exposing by the image forming device 21 are performed, and subsequently developing by M toner is performed, and after recharging, image exposing by the image forming device 22 is performed thereby developing in black is performed.

Such constitution that two image forming means and plural developing devices are arranged alternately is not limited to the color image forming but can utilize various modes effectively.

The image retainer is constituted to be rotated, and required to have size larger than that of image in order to superpose images in plural times of rotation.

When the image size includes A-3 size, a small image such as A-4 or B-5 is also operated in the same print speed and the efficiency becomes quite bad. In such a case, plural sheets of image may be formed on the image retainer (Japanese patent applications Nos. 60-66321, 60-66322).

Corresponding to this, the read scan is repeated in that scan is performed in matching to the document and then reset to the start position. In the time chart shown in FIG. 14, the first read scan includes two times of write scan. The timing of charging, image exposing, developing varies corresponding to this, but the delay time between two image forming means does not vary.

As seen from process in FIGS. 6 through 9, the electrostatic image (latent image) forming means is constituted by the charging device and the image exposing device.

Next, the embodiments in FIGS. 6 through 9 will be described more concretely as embodiments 1~5 respectively.

EMBODIMENT 1 (EXAMPLE OF FIG. 6)

The color image forming device shown in FIG. 1A and FIG. 2 was used. Color image forming was performed according to the method shown in FIG. 12 and FIG. 14. The image retainer 1 has an OPC (organic photoconductive layer) surface layer, and its peripheral speed was 90 mm/sec. The surface of the image retainer 1 was charged by the charging device 11 using scorotron corona discharger to $-600$ V, and the first image exposing was performed to the charged surface by magenta color image information using the semiconductor laser beam scanner at density of 16 dot/mm. As a result, electrostatic image was formed on the image retainer 1 in that potential of the background of the exposing portion was $-50$ V whereas potential of the non-exposing portion was $-600$ V. The electrostatic image was subjected to the first developing by the developing device 31 as shown in FIG. 3.

In the developing device 31, a developer composed of a carrier formed by resin coating of spherical ferrite and having mean particle diameter 30 $\mu$m, magnetization 30 emu/g, resistivity $10^{14}$ $\Omega$cm, and a non-magnetic toner formed by styrene-acrylic resin with a magenta pigment at ten weight parts and other charging control agent added thereto and having mean particle diameter 10 $\mu$m was used under condition that ratio of the toner to the carrier becomes 25 wt %. The developing sleeve 131 had outer diameter 20 mm and rotational speed 100 rpm, and the the magnet member 132 had developing sleeve surface flux density of the N, S magnetic poles being 1000 gauss and rotational speed 1000 rpm. Thickness of the developer layer at developing region was 0.4 mm, gap between the developing sleeve 131 and the image retainer 1 was 0.6 mm, and DC voltage of $-100$ V and AC voltage of 3 kHz, 1000 V (effective value) were applied in superposition to the developing sleeve 131 and the developing was performed according to the non-contact developing condition.

While the electrostatic image was developed by the developing device 31, other developing devices 32~34 shown also in FIG. 5 were held at non-acting state. This can be attained in that the developing sleeve 131 is separated from the power source 139 and put in floating state, or that DC bias voltage in the same polarity as charging of the image retainer 1 and opposite polarity to charging of the toner is applied positively to the developing sleeve 131. Since the developing devices 32~34 perform developing under non-contact developing condition in similar manner to the developing device 31, the developer layer on the developing sleeve 131 need not be especially removed. In the developing device 33, the developer having constitution of toner including yellow pigment in place of magenta pigment of toner of the developer in the developing device was used. In FIG. 12, the developer having constitution of toner including copper phthalcyanine as a cyan pigment was used. Further in FIG. 14, the developer having constitution of toner including carbon black as a black pigment was used. Of course, other pigments or dyes may be used in the color toner, and the order of developing colors and the order of the developing devices may be suitably selected To the surface of the image retainer 1 subjected to the first developing, the scorotron corona charging device 12 acted and recharging of $-650$ V was performed. The second image exposing by yellow color image information was performed to the charged surface using the laser beam scanner 221, and subsequently the second developing of magenta toner was performed to the developing sleeve 131 under non-contact developing condition that DC voltage of $-150$ V and AC voltage of 3 kHZ, 1000 V are applied in superposition using the developing device 33. Next, during the second rotation, the charging, the image exposing of cyan color image information using the laser beam scanner, and the third developing of cyan toner using the developing device 32, and also the charging, the image exposing of black color image information using the laser beam scanner, and the fourth developing of black toner using the developing device 34 were repeated. In the second developing or later, depending on variation of the surface potential of the image retainer 1, developing characteristics or color reproducibility, DC bias component of voltage applied to the developing sleeve 131, amplitude of AC component, frequency, selection time of the time selection conversion and the like were suitably varied. Particularly, since absolute value of the charging potential was gradually increased and at the same time absolute value of the DC bias was gradually increased, color mixing of toners was prevented effectively.

After the fourth developing was performed and the color image of four colors was formed on the image retainer 1, the color image was made to be easily transferred by the charging device 13 before transfer and the exposing lamp 41 before transfer, and then transfereed onto the transfer member P using the transfer device 14 and fixed using the fixing device 61. Suitable exposing by the exposing lamp 41 before transfer also has effect that the transfer member P can be easily separated from the image retainer 1. The image retainer 1 after transfer of the color image was charge-eliminated by the charge eliminating device 42, and residual toner was removed from the surface of the image retainer 1 by abutting of the cleaning blade of the cleaning device 51 and the sponge roller, and when the surface of the color image forming passed through the cleaning device 51, one cycle process of the color image forming was finished completely.

In the color image recorded in above process, each color had sufficient density and was clear, but slight mixing of toners was seen at portion where each color toner closely adhered mutually.

Timing of the above-mentioned image forming process is shown in the timing chart of FIG. 14. The image signal read by the CCD image sensor 4 is not stocked by the dot pattern memory, but M pattern signal and Y pattern signal are outputted without passing through the page memory or is necessary through the line memory to the recording device. Other C pattern signal and BK pattern signal are delayed by the shift register (delay circuit) having capacitance nearly equivalent to that between the image forming devices, and taken in sequence in matching with the image forming timing. Consequently, the first M toner image and Y toner image are formed substantially in synchronization with the image reading. In the image forming process, since the image forming is performed in two times of read scan and two rotations of the image retainer 1 and moreover read and write are performed in synchronization, high speed recording is possible and capacity of the page memory corresponding to plural sheets can be saved.

EMBODIMENT 2 (EXAMPLE OF FIG. 7 AND FIG. 8)

The color image forming device shown in FIG. 1A and FIG. 2 was used.

Two-color image was obtained from monocolor image. The document was monocolor image of black, and the specific region was made green and other was made red by trimming.

The image retainer 1 had the Se photosensitive surface layer with increased sensitivity at long wavelength, and its peripheral speed was 120 mm/sec. The surface of the image retainer 1 was charged by the charging device 11 using scorotron corona discharger to $+800$ V, and the first image exposing was performed to the charged surface by the laser beam scanner of FIG. 2 using the semiconductor laser at density of 12 dot/mm. As a result, electrostatic image was formed on the image retainer 1 in that potential of the background was $+800$ V whereas potential of the exposing portion was $+50$ V. The electrostatic image was subjected to the first reversal developing by the developing device 31 as shown in FIG. 5.

The developing condition by the developing device 31 having magenta toner was in that mean particle diameter of the carrier of the developer was 30 μm, ratio of the toner to the carrier was 20 wt %, and DC voltage of $+600$ V and AC voltage of 1.5 kHz, 700 V (effective value) were applied in superposition to the developing sleeve 131, and other conditions were similar to Embodiment 1. Also condition of other developing devices 32~34 was made similar to Embodiment 1 except for the bias voltage. In this case, however, the bias voltage by which the developing device not to take part in developing was held to the non-developing state was in opposite polarity to charging of the toner and also in opposite polarity to charging of the image retainer. To the surface of the image retainer 1 subjected to the first developing by magenta toner, the charging device 12 did not act and the second image exposing by the laser beam scanner was not performed, but subsequently the second developing of yellow toner was performed by the developing device 33. Thereby the red toner image was formed on the same latent image. During the second rotation, recharging was performed to +800 V by the charging device 12 and then the second image exposing was performed by the image forming device 21, and also the third developing of cyan toner by the developing device 32 and the fourth developing of yellow toner by the developing device 33 were repeated, thereby the green toner image was formed on the same latent image. In the second developing or later, depending on variation of the surface potential of the image retainer 1, developing characteristics or color reproducibility, DC bias component of voltage applied to the developing sleeve 131, amplitude of AC component, frequency, selection time of the time selection conversion and the like were suitably varied. In this example particularly, since the DC bias was increased in sequence per time, color reproducibility of toners was improved effectively.

After the two-color image was formed on the image retainer 1 subjected to the fourth developing, in similar manner to Embodiment 1, transfer and fixing were performed on the transfer member P, and charge eliminating and cleaning of the image retainer 1 were performed, thus one cycle process of the color image recording was finished.

Timing of the above-mentioned image forming process is different partially from the timing chart of FIG. 14. Among the image signal read by the CCD image sensor 4, only BK pattern signal is utilized. The BK pattern signal converted to the red image is outputted without passing through the page memory or if necessary through the line memory and the first image forming means to the recording device. In the image forming process, the first red toner image is formed substantially in synchronization with the first image reading. Since the green toner image forming is performed in two times of read scan and the second rotation of the image retainer 1 in similar manner to the first time and moreover read and write are performed in synchronization, the delay circuit is not used.

EMBODIMENT 3 (EXAMPLE OF FIG. 7 AND FIG. 8)

The color image forming device shown in FIG. 1A and FIG. 2 was used.

Two-color image was obtained from monocolor image. The document was monocolor image of black, and the specific region was made magenta and other was made black by trimming. The image retainer 1 had the Se photosensitive surface layer, and its peripheral speed was 120 mm/sec. The surface of the image retainer 1 was charged by the charging device 11 using scorotron corona discharger to +800 V, and the first image exposing was performed to the charged surface by the image forming device 21 of FIG. 4 using the semiconductor laser at density of 12 dot/mm. As a result, electrostatic image was formed on the image retainer 1 in that potential of the background was +800 V whereas potential of the exposing portion was +50 V. The electrostatic image was subjected to the first developing by the developing device 31 as shown in FIG. 5.

The developing condition by the developing device 31 having magenta toner was in that mean particle diameter of the carrier of the developer was 30 μm, ratio of the toner to the carrier was 20 wt %, and DC voltage of +600 V and AC voltage of 1.5 kHz, 700 V (effective value) were applied in superposition to the developing sleeve 131, and other conditions were similar to Embodiment 1. Also condition of other developing devices 32~34 was made similar to Embodiment 1 except for the bias voltage. In this case, however, the bias voltage by which the developing device not to take part in developing was held to the non-developing state was in opposite polarity to charging of the toner and also in opposite polarity to charging of the image retainer 1.

To the surface of the retainer 1 subjected to the first developing by magenta toner, the charging device 12 acted and the second image exposing was performed using the image forming device 22, and further the second developing of black toner was performed using the developing device 34. Thereby the two-color toner image composed of magenta and black was formed. In the second developing or later, depending on variation of the surface potential of the image retainer 1, developing characteristics or color reproducibility, DC bias component of voltage applied to the developing sleeve 131, amplitude of AC component, frequency, selection time of the time selection conversion and the like were suitably varied. In this example particularly, since the DC bias was increased in sequence per time, color reproducibility of toners was improved effectively.

After the two-color image was formed on the image retainer 1 subjected to the developing, in similar manner to Embodiment 1, transfer and fixing were performed on the transfer member P, and charge eliminating and cleaning of the image retainer 1 were performed, thus one cycle process of the color image recording was finished. In this case, the image retainer 1 forms the two-color image in one rotation. Timing of the above-mentioned image forming process uses only forward half of that shown in the timing chart of FIG. 14. Among the image signal read by the CCD image sensor 4, only BK pattern signal is utilized. The BK pattern signal converted to the M image is outputted without passing through the page memory or if necessary through the line memory to the recording device but each pattern signal of BK outputted as the black image is delayed by the shift register having capacitance substantially equivalent to that between the image forming devices and then taken in matching with the timing of image forming. Consequently, the first M toner image is formed substantially in synchronization with the image reading. In the image forming process, since the image forming is performed in one time of read scan and one rotation of the image retainer 1 and moreover read and write are performed in synchronization, high speed recording is possible.

The color image recorded in above process was clear similarly to that in Embodiment 1.

EMBODIMENT 4 (EXAMPLE OF FIG. 8)

The same apparatus as that in Embodiment 1 was used, and the Se photosensitive member in Embodiment 2 was used. DC voltage of +600 V and AC voltage of 1000 Hz, 500 V (effective value) were applied in superposition to the developing sleeve 131 of the developing device, and the surface of the image retainer 1 was charged by the charging device 12 to surface potential 700 V and the reversal image forming was performed, and other conditions were similar to that in Embodiment 1. The color image recording was performed under the above-mentioned conditions.

In the recorded color image, in comparison to Embodiment 1, mixing of toners was decreased at portion where each color toner closely adhered mutually, and the image was more clear.

According to this embodiment, as already described, in order to superpose toner images composed of Y, M, C, BK toners, it is preferable that the previous image exposing position and the subsequent image exposing position are superposed. In this case, in order to form the electric latent image by the image exposing, it is preferable that the toner image formed previously has optical transmittance to the image exposing ray. Moreover, since the order of colors to be developed considerably affects the clearness of the color image, special precaution should be taken to determine the order of colors.

EMBODIMENT 5 (EXAMPLE OF FIG. 9)

The recording device as shown in FIG. 1B was used where the exposing lamp 71 (shown by imaginary line) was installed between the charging device 12 and the image forming device 22. DC voltage of +600 V and AC voltage of 2 kHz, 500 V (effective value) were applied in superposition to the developing sleeve 131 of the developing device. Before each time of image exposing after the second image exposing, the surface of the image retainer 1 was charged by the charging device 11 or 12 to surface potential +700 V, and the uniform weak exposing was applied to the surface of the image retainer 1 by the exposing lamp 71 (shown by imaginary line) so that the surface potential is reduced to nearly 0 V, and other conditions were similar to Embodiment 4. The color image recording was performed under the above-mentioned conditions. If the uniform exposing is too strong, fatigue of the photosensitive member due to light becomes large.

In the recorded color image, mixing of toners was not seen even at portion where each color toner closely adhered mutually, and the image was quite clear.

This embodiment is particularly effective to the photosensitive member having fatigue due to light.

According to the embodiment, since the electrostatic image forming is repeated four times using two sets of devices, the recording device can be constituted at small size and low cost, and the recording speed is relatively rapid and synchronous control of the image exposing of each time can be performed easily and exactly. Developing of each time can be performed by a developing method that toner to charge in opposite polarity adheres to electrostatic image where the developing density control is relatively easy, and also by a developing method that toner to charge in the same polarity adheres to electrostatic latent image where a laser beam scanner can be used in the image exposing device. Furthermore, in any of the developing methods, the developing is performed under non-contact developing condition thereby the color image with sufficient developing density and excellent clearness can be recorded.

In addition to the foregoing embodiments, various modifications are possible based on idea of the present invention.

When the color image need not be formed, for example, when the image of black color only is formed, the electrostatic latent image can be formed by either one combination of the charging device 11 or 12 or the image forming device 21 or 22. When dark decay of the photosensitive layer of the image retainer 1 is large, it is preferable that the latent image is formed by combination of the charging device 12 and the image forming device 22 and then developed by the developing device 34. Because it can be utilized that the time between each process of charging, image exposing, developing is short (distance is small). When monocolor image is formed using toner of only one color among yellow, magenta and cyan, the combination may be selected based on the same idea.

In the case of two colors or three colors, of course, any combination may be selected depending on its necessity or performance.

According to suitable selection of combination of the image exposing device and the developing device, various color images can be formed.

Furthermore, when the image forming devices 21 and 22 respectively perform the image exposing based on individual image information, the image composing can be performed on the image retainer 1.

The invention is not limited to the case that the image retainer uses the drum-shaped recording device as already described, and also not limited the the case that the color image is transferred onto the transfer member. That is, the invention can be applied also to the case that the image retainer is that to be mounted on the substrate, such as electrofax paper, and the color image formed thereon can be fixed without transfer. In this case, the charging device before transfer, the exposing lamp before transfer, the transfer device, and further the cleaning device become unnecessary. Also in the case of transfer, the charging device before transfer, the exposing lamp before transfer, or the charge eliminating device may be omitted. Furthermore, the transfer may be direct transfer or transfer through an intermediate transfer member, and the fixing is not limited to the heat roller fixing.

Figure 15A:
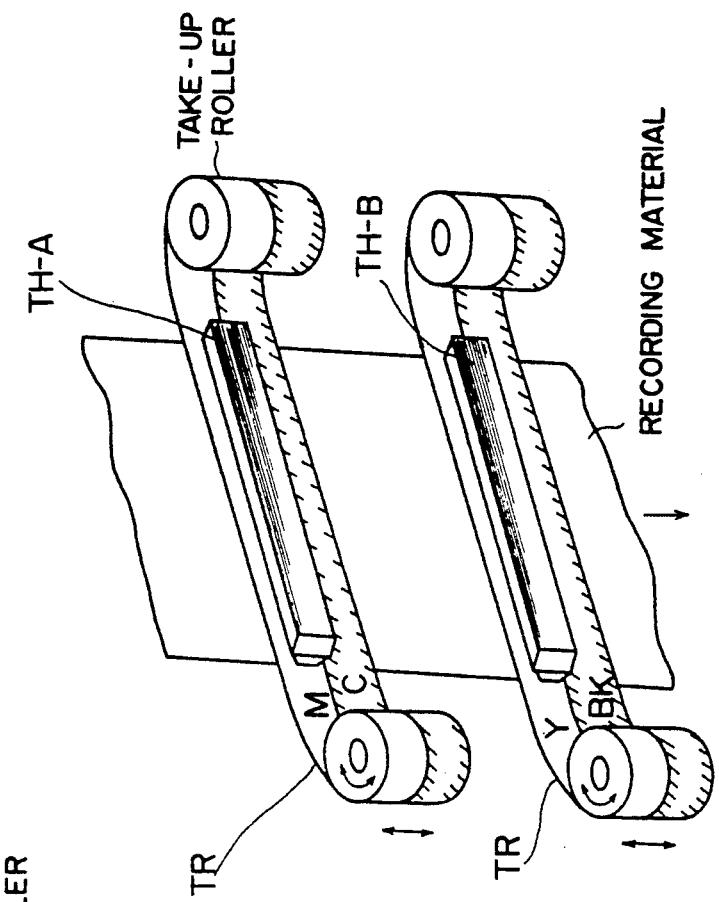
FIGS. 15A and 15B are schematic views of image forming using thermal transfer technology.
Figure 15B:
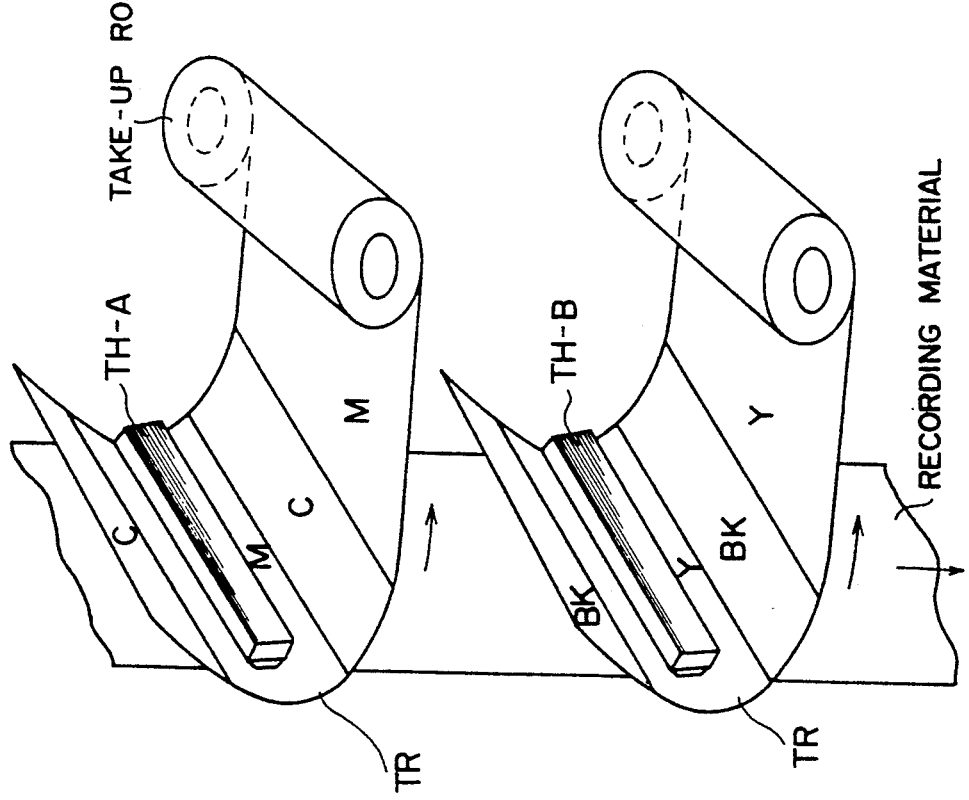

The invention is preferably used in electrophotographic technology, but may be also applied to image forming technology using thermal transfer technology. FIGS. 15A, 15B show examples respectively, and each has two sets of thermal line heads TH installed in perpendicular direction to the paper. In this case, it is required in the invention that the image forming means is a line head. Between the thermal line head TH and the paper, for example, a thermal ink ribbon TR of M and C, or Y and BK is interposed thereby the image is formed. In FIG. 15A, the thermal ink ribbon TR is moved in the perpendicular direction to the line of the thermal line head TH. In FIG. 15B, the thermal ink ribbon TR is moved in the line direction, and upper and lower members are changed thereby colors can be changed. The recording member is moved by reciprocation up and down, or by rotation in fixed state to upper and lower sides of the drum. According to the thermal transfer technology, the thermal line head A (TH-A) is installed in place of the charging device 11, the image forming device 22 and the developing devices 31, 32, and the thermal line head B (TH-B) is installed in place of the charging device 12, the image forming device 22 and the developing devices 33, 34, thereby the image recording corresponding to the latent image forming, the developing in the electrophotographic technology is performed, and the image retainer 1 corresponds to the support member of the recording substance.

As above described, the present invention has following effects.

(1) Since a plurality of latent image forming means are used and at least one among these means is used repeatedly, in comparison to the image forming by one rotation or one time of moving of the image retainer or the image forming by 3~4 rotations or 3~4 times of moving thereof, the color image forming apparatus with small size and high speed can be constituted.

(2) In synchronization with the image read means, color image forming can be performed efficiently using a memory of small capacity.

(3) Various multicolor modes such as monocolor mode, two-color mode, color mode, can be efficiently dealt with. Monocolor print or two-color print can be performed by one time of read scan and one rotation of the image retainer or one time of moving of the image retainer.

In another embodiment of the invention as shown in FIGS. 19 and 20, an optical system comprises a laser light source 316 with a drive circuit for generating optical signal based on image data per color to produce an electrostatic image developed by the developing devices 31 and 32 in changing by time difference of one rotation of the photosensitive member 1, and a laser light source 317 for generating light signal based on image data per color to produce an electrostatic image developed by the developing devices 33 and 34 by time difference of one rotation of the photosensitive member 1 in timing delayed by time that the surface of the photosensitive member 1 is moved through distance between incident positions of the laser beams 303, 307, where the laser beams outgoing from both laser light sources 316, 317 and having different wavelength pass through collimator lenses 318, 319 respectively, and then both optical paths are combined by a combining means 320 such as a deflection beam splitter, and combined beam outgoing from the combining means 320 is incident to a rotary polygon mirror 223, and reflecting beam scanned in the rotary polygon mirror 223 passes through an $f-\theta$ lens 224, and then separated again into laser beams 303, 307 by a separating means 323 such as a dichroic mirror, and the laser beams 303, 307 are incident to the photosensitive member 1 by mirrors 324, 325 respectively. Since two sorts of laser beams are combined by the combining means and the combined beam is scanned in the rotary polygon mirror and then separated again and the separated beams are incident respectively to the photosensitive member 1, both laser rays are incident to the rotary polygon mirror at the same position in perpendicular direction to the rotary axis of the rotary polygon mirror, and the scanning direction is the same thereby such problem is eliminated that the registration becomes difficult due to variation of the surface accuracy, and the cylindrical lens need not be installed at rear side of the $f-\theta$ lens and therefore the registration of exposing becomes easy, and further when the laser beam passes through the $f-\theta$ lens and then is separated as shown in the figure, one $f-\theta$ lens will do with respect to two laser beams.

When the deflection beam splitter is used in the combining means 320, in the laser light sources 316, 317, semiconductor lasers are arranged so that respective p-n junction surfaces are perpendicular to the deflection beam splitter, and outgoing beams of respective semiconductor layers pass through the collimator lenses 318, 319 as shown in FIGS. 19 and 20, and then are incident to the deflection beam splitter directly. Also as shown in FIG. 21, in the laser light sources 316, 317, the semiconductor lasers may be arranged so that the p-n junction surfaces are in parallel to the combining means 320, i.e., the deflection beam splitter. For example, outgoing beam of the semiconductor laser of the laser light source 316 passes through the collimator lens 318, and then passes through a rotating means 326 such as ½ wavelength plate to rotate the deflection surface by 90°, and is incident to the deflection beam splitter. The combining means 320 is not limited to the deflection beam splitter as above described, but that having similar constitution to the separating means 323 may be used.

In the shown example, although a multi-layer film plate is used in the separating means 323, the separating means 323 is not limited to this, but a prism having a multi-layer film or a deflection beam splitter similar to the combining means 320 may be used. When a multi-layer film plate having spectral characteristics as shown in FIG. 22 where separation occurs about position of wavelength 800 nm is used in the separating means 323, if a laser generating laser ray having wavelength shorter than 800 nm, e.g., 780 nm, and a laser generating laser beam having wavelength longer than 800 nm, e.g., 810 nm, are used respectively in the laser light sources 316, 317, both laser beams can be separated substantially completely. The multi-layer film plate in FIG. 22 represents transmissivity nearly 100% at incident angle 90° irrespective of wavelength of the incident ray.

The image forming apparatus of the invention is not limited to the shown example, but two sets of optical systems as shown in FIGS. 19 and 20 may be provided so that combination of toner images of four colors can be made in one rotation of the photosensitive member, or optical system as shown in FIGS. 19 and 20 and an optical system having one laser beam may be provided so that combination of toner images of three colors can be made in one rotation of the photosensitive member. Further, the optical system may be constituted so that, for example, three laser beams having different wavelength are combined and the combined beam is incident to the rotary polygon mirror and scanned, and then separated again in three and incident to the photosensitive member. This is realized in that two combining means and two separating means are used, and the combining and the separating are performed in two steps.

In this embodiment of the image forming apparatus of the invention, one rotary polygon mirror hence one $f-\theta$ lens will do with respect to a plurality of laser beams, and a cylindrical lens need not be installed at rear side of the $f-\theta$ lens, and since the plurality of laser beams have the same scanning direction problem of difficulty of the registration due to variation of the surface accuracy of the rotary polygon mirror is not produced. Consequently, the apparatus can be constituted at small size and low cost, and multi-color image without color slippage can be easily recorded.

In another embodiment of the invention, as shown in FIG. 23, semiconductor lasers 410-1, 410-2, collimator lenses 402-1, 402-2, and $f-\theta$ lenses 406-1, 406-2 are constituted in every two members superposed up and down. One optical path passing through the $f-\theta$ lens 406-1 and common optical scanner 405 is bent to downward by a mirror 408-1 and incident to a photosensitive member. Other optical path passing through the $f-\theta$ lens 406-2 is bent downward by a mirror 408-2' and converted in direction by a mirror 408-2" and incident to a photosensitive member.

FIG. 24 shows another constitution example of a laser optical system using plastic lenses 407-1, 407-2 as focusing lenses of the scan optical system.

In this embodiment of the invention, in information recording optical system to perform image recording using a plurality of light beams, an optical scanner, for example, polygon is commonly used thereby information recording optical system having high position accuracy in compact and simple structure can be provided.

Figure 25:
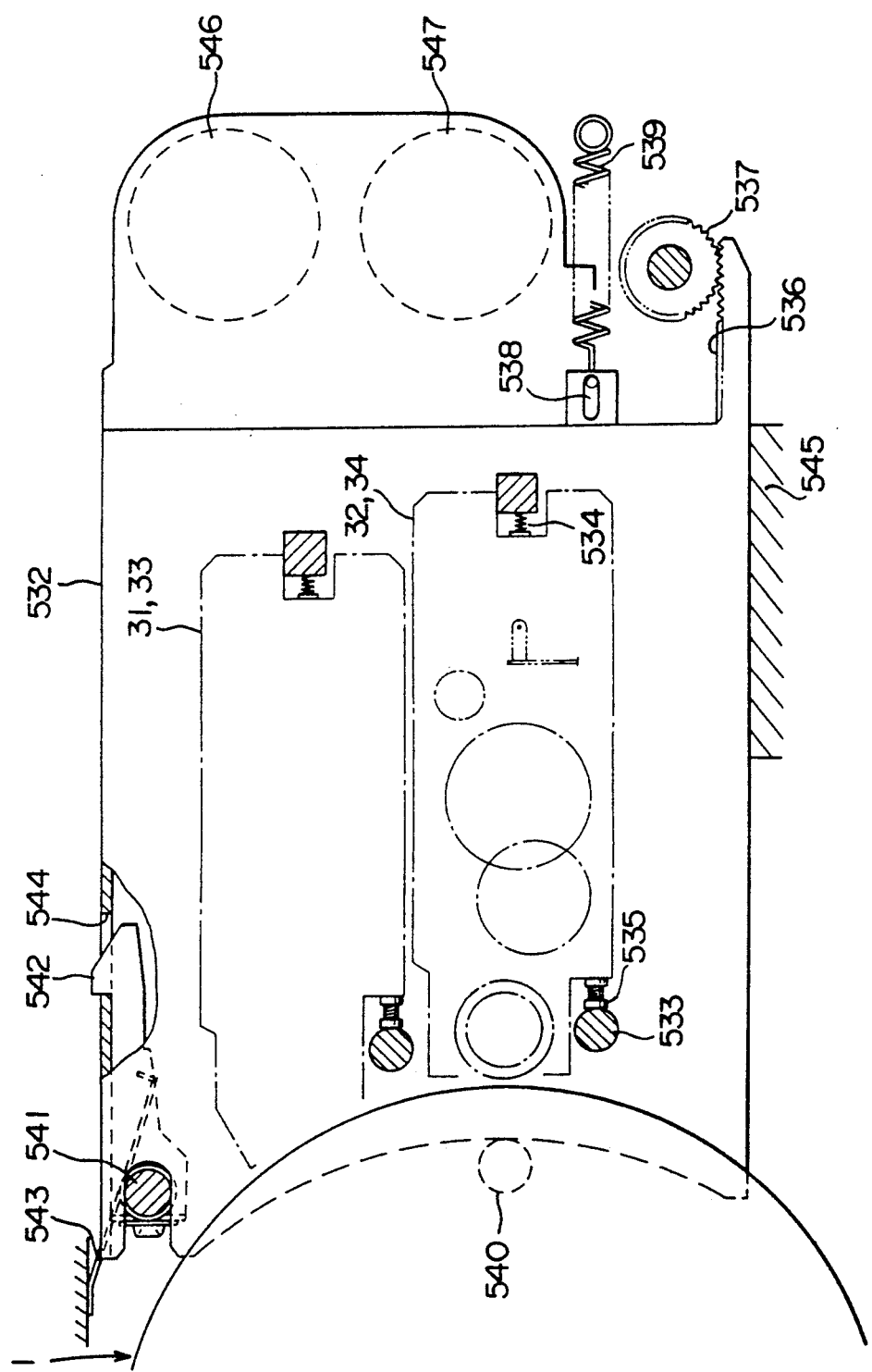
FIG. 25 is a partial view illustrating an example of a developing device enclosing case in another embodiment of a color image forming apparatus of the invention.

In another embodiment of an image forming apparatus of the invention, as shown in FIG. 25, the developing devices 31 and 32, and 33 and 34 are enclosed in a case 532 and arranged around the photosensitive drum 1.

When the case 532 is taken out of the image forming apparatus, the developing devices 31 and 32 or 33 and 34 are installed or detached to the case 532 from an opening portion of the case 532 shown in left side in the figure. That is, when the developing device 31 is installed to the case 532, a set pin 533 provided on the case 532 is retracted from the projecting state towards inside, and the developing device 31 is inserted in the case 532 and a compression spring 534 provided on the case 532 is pushed to sufficiently compressed state, and the set pin 533 is projected towards inside. Thereby the developing device 31 is set to the case 532 in the state that pushing by the compression spring 534 is stopped by the set pin 533. Engaging of the developing device 31 with the set pin 533 is performed at the top end of a position adjusting screw 535, thereby the set position of the developing device 31 can be adjusted. When the developing device 31 is taken out of the case 532, the stop pin 533 is retracted and therefore the developing device 31 is pushed to the opening portion of the case 532 then the developing device 31 may be pulled out. The constitution is not limited to this, but, for example, the developing device 31 is simply inserted in the case 532, and the case 532 is installed to the apparatus body as hereinafter described thereby a spacer roller rotatable in coaxial relation to the developing roller abuts on the circumferential surface on both sides of the photosensitive drum 1 thereby the position setting of the developing device 31 may be made.

The case 532 enclosing the developing device 31 is inserted in the apparatus in that a rack 536 of the case 532, from front side of the figure, is meshed with a pinion 537 installed to side of the apparatus body and the top end hook portion of the tension spring 539 installed at side of the apparatus body is entered in a spring holding hole 538 of the case 532. The inserted case 532 rotates the pinion 537 and feeds it to the left until abutting on the stop pin 540 installed to side of the apparatus body against tension of the tension spring 539. In this step, a set hook 542 installed on a shaft 541 at side of the apparatus body is engaged with a set hole 544 of the case 532 according to biasing of the spring 543 thereby it is set to the image forming apparatus. When the case 532 is taken out of the image forming apparatus, a shaft 541 is rotated and a set hook 542 is disengaged from the set hook 544 of the case 532, since the case 532 is retracted to the right by tension of the tension spring 539, the case 532 is pulled to front side in the paper surface from that position or from position where the case 532 is further retracted to the right by the pinion 537. Guide of the case 532 in installing or detaching is performed by a support guide 545 at side of the apparatus body and engaging of the case 532 with the shaft 541. The case 532 in FIG. 25 is provided with motors 546, 547 to drive moving members such as a developing roller for the enclosed developing device 31 and a developer stirring roller as well as a transmission mechanism (not shown) so that connection of movement transmission mechanism is not required between the case 532 and side of the apparatus body.

As above described, the developing devices 31, 32 and 33, 34 together with the case 532 are installed or detached to the image forming apparatus, thereby installing or detaching of the developing devices during inspection or maintenance can be performed efficiently with little labor.

Figure 26:
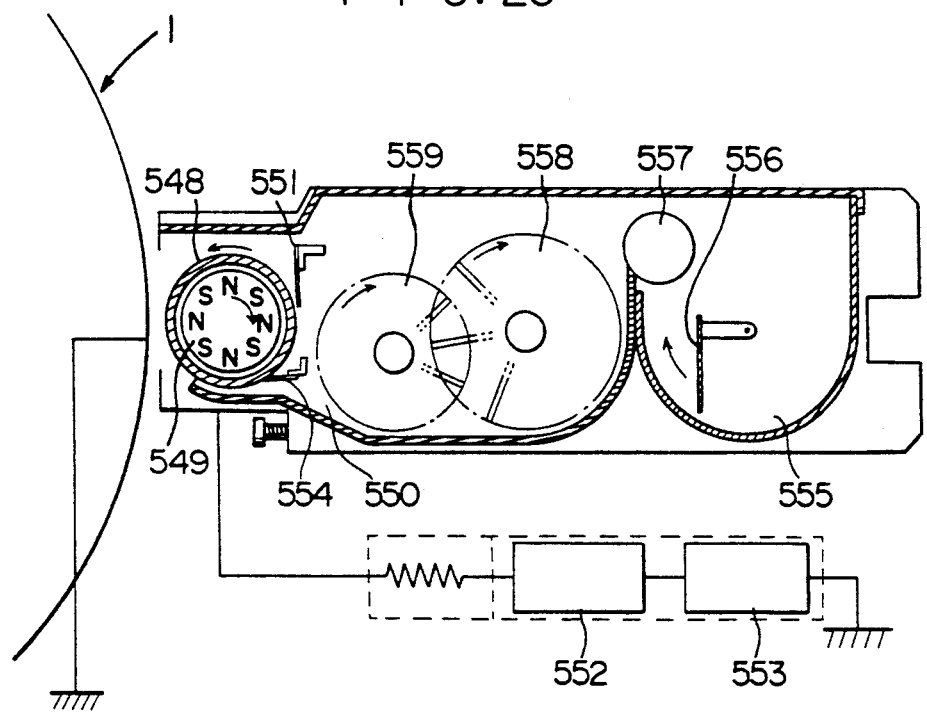
FIG. 26 is a partial view illustrating an example of a developing device.

The developing devices 31~34 preferably perform developing under non-contact developing condition where toner image already formed is not harmed, and changing between developing state and non-acting state can be simply performed by step of rotation of the developing roller or changing of the bias voltage. A developing device in FIG. 26 represents such example where a developing roller composed of a sleeve 548 and a magnet member 549 within the sleeve 548 adsorbs developer in a developer reservoir 550 to surface of the sleeve 548 by magnetic force of the magnet member 549, at least one of the sleeve 548 and the magnet member 549 is rotated in arrow direction thereby the adsorbed developer is conveyed in the same direction as the rotational direction of the sleeve 548, at midway of the conveying a layer thickness regulating blade 551 of urethane rubber plate makes layer thickness of developer into a layer thinner than a gap between the photosensitive drum 1 and the sleeve 548, and developing bias voltage in superposition of AC voltage and DC voltage is applied to the sleeve 548 from the bias power source thereby in developing region where the sleeve 548 is opposed to the photosensitive drum 1 toners are flown from the developer layer and adhere to the electrostatic image and the developing is performed. the developer layer passing through the developing region is scraped from the surface of the sleeve 548 by the cleaning blade 554 using a Mylar plate of thickness 80 μm and returned to the developer reservoir 550. The developer reservoir 550 is supplied with toners from a toner chamber 555 by a toner supply device 556 and a sponge roller 557, and the developer in the developer reservoir 550 is stirred uniformly by stirring rollers 558, 559 and frictional charging is given to the toners.

Non-acting state of the developing device is produced in that the sleeve 548 is grounded or put in floating state, or DC voltage in opposite polarity to charging of toner is positively applied to the sleeve 548, or further the conveying rotation of the developing roller is stopped. When the developing device is installed to the case 532, wiring of the sleeve 548 and the case 532 are connected by a connector, and connection of wiring of the case 532 with the bias power source at the apparatus body side is performed together with connection of the motors 546, 547 to the power source by a socket provided on a cord.

Figure 28:
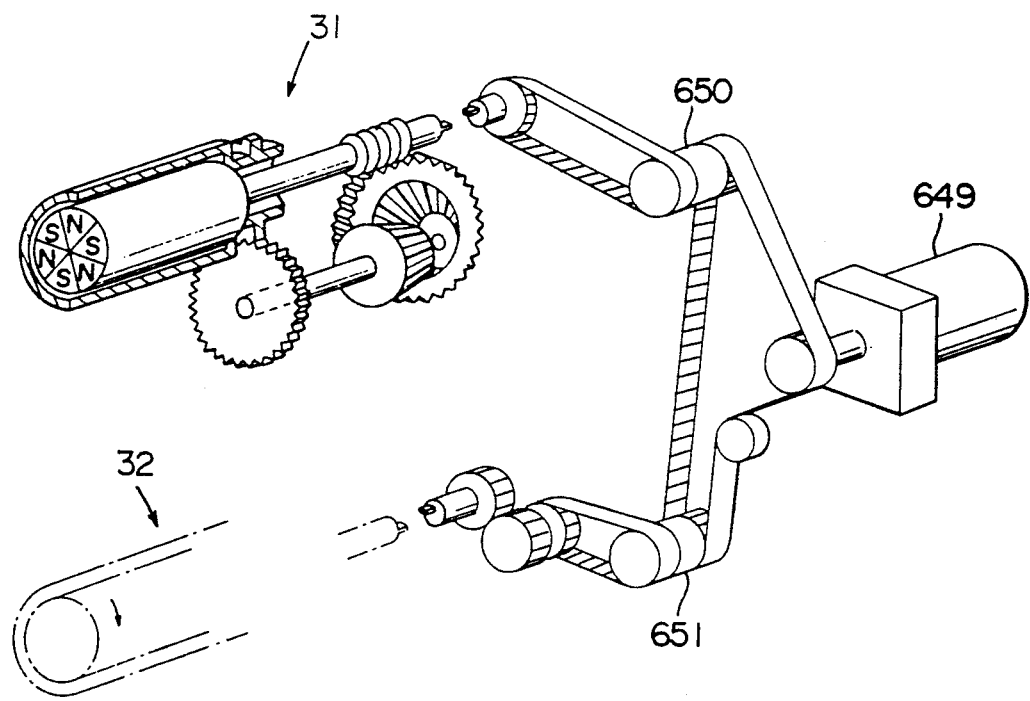
FIGS. 27 and 28 are perspective views of main part constitution illustrating an example of a drive mechanism of a moving member of a developing device.
Figure 27:
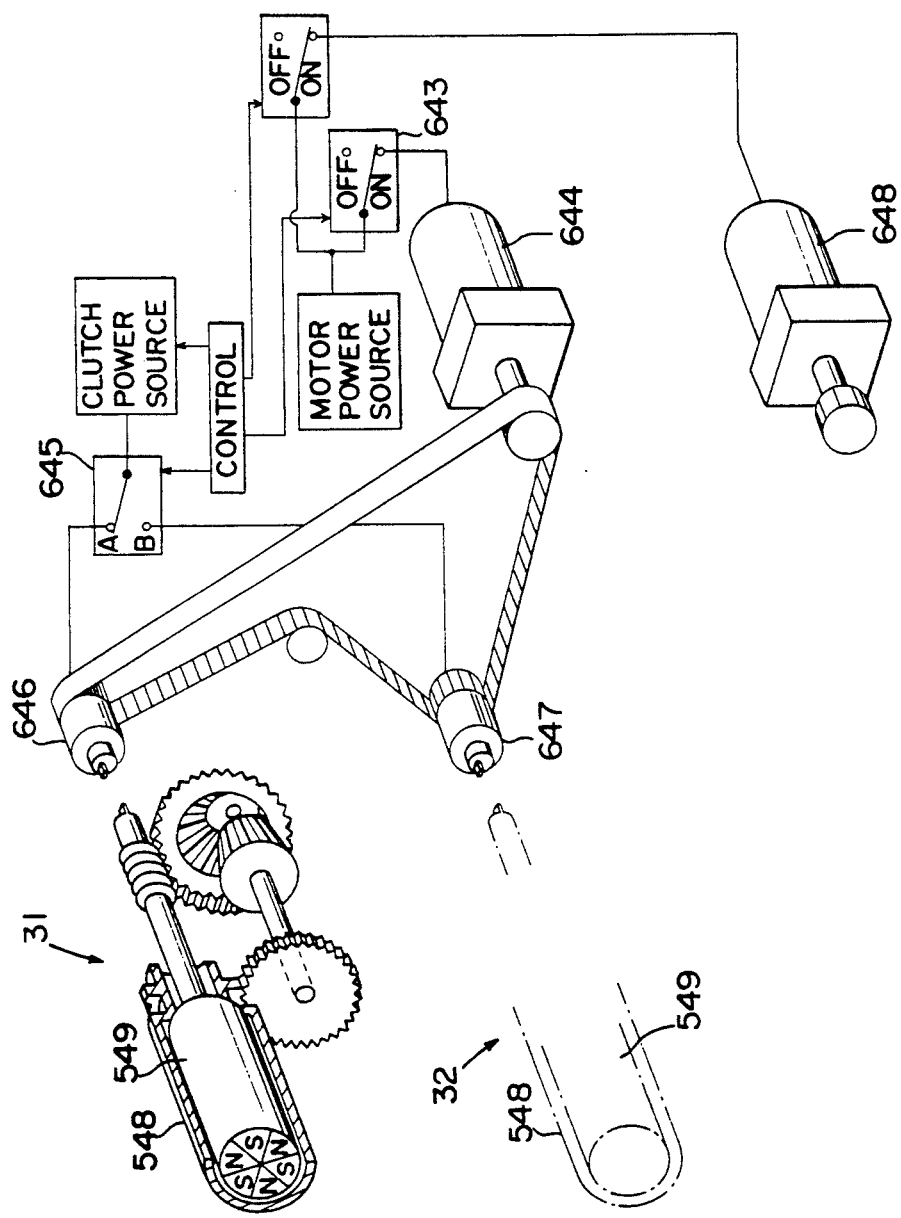

In another embodiment of the invention, movement of moving members such as a developing roller or a stirring roller of developing devices 31 and 32 is performed by a drive device as shown in FIG. 27 or FIG. 28 using a common motor.

In a drive device of FIG. 27, while developing by the developing device 31 or 34 is performed the ON/OFF switch 643 is turned on by the control device and a motor 644 is rotated by a motor power source, and while developing is performed by the developing device 31 the clutch power source is turned on and the changeover switch 645 is changed to A contact, and while developing is performed by the developing device 32 the changeover switch 645 is changed to B contact. Consequently, while the changeover switch 645 is changed to A contact, the rotation of the motor 644 is transmitted by an electromagnetic clutch 646 through the magnet member 549 of the developing device 31 and a worm, a worm wheel to the sleeve 548, and while the changeover switch 645 is changed to B contact, rotation of the motor 644 is transmitted by an electromagnetic clutch 647 to the magnet member 549 of the developing device 32 and the sleeve 548. The stirring roller or the like is rotated by a gear train (not shown) in similar manner to the magnet member 549. Movement of moving members of the developing devices 33 and 34 is performed also by a motor 648 similarly.

In a drive device of FIG. 28, during developing by the developing device 31 a motor 649 is rotated in the same direction as that of the motor 644 in FIG. 27, and during developing by the developing device 32 the motor 649 is rotated in the reverse direction, and one-directional clutches 650 and 651 transmit respectively rotation in the same direction and rotation in the reverse direction to the developing devices 31 and 32, thereby the developing devices 31, 32 are driven in similar manner to the drive device in FIG. 27. Regarding the developing devices 33 and 34, similar operation is performed.

As above described, even when moving members of the developing devices 31 and 32, and 33 and 34 are driven by a common motor, timing of developing of the developing devices 31 and 32 or 33 and 34 is not overlapped, thereby the common motor may be that of small capacity enough to control one developing device, and since neighboring developing devices are driven by the common motor, the transmission mechanism can be constituted simply in compact structure.

What is claimed is:

1. A color image forming apparatus comprising:
    a color image reading means for optically scanning a document to produce blue, green and red color separated information;
    means for processing said color separated information supplied by said reading means and generating black, yellow, magenta and cyan color signals;
    a rotatable image retainer;
    two latent image forming means for forming latent images at a common region on said image retainer in accordance with said color signals, a first latent image formation corresponding to a first of said black, yellow, magenta and cyan color signals by one of said two latent image forming means being synchronized with a scanning of said color image reading means to form a first latent image at a first writing position and activation of the other of said latent image forming means for a second latent image formation corresponding to a second of said black, yellow, magenta and cyan color signals being delayed by a single delay means to form a second latent image at a second writing position, wherein said delay means compensates for the time necessary for the common region on said image retainer to travel between said first and second writing positions; and
    four developing means, each developing one of said latent images to form a multicolor image composed of multiple toner images, on said image retainer;
    wherein two color latent images corresponding to two of said color signals are formed on said image retainer and developed by two of said developing means during a first rotation of said image retainer corresponding to a first optical scanning of said document, and the remaining two color latent images corresponding to the remaining two of said color signals are formed on said image retainer and developed by the remaining two of said developing means during a second rotation of said image retainer corresponding to a second scanning of said document, all of said toner images being transferred simultaneously to a transfer sheet, and
    wherein said delay means delays one of said two of said color signals corresponding to said first scanning of said document to compensate for the time necessary for the common region on said image retainer to travel between said first and second writing positions, and said delay means delays one of said two of said color signals corresponding to said second scanning of said document to compensate for the time necessary for said common region on said image retainer to travel between said first and second writing position.

2. The apparatus of claim 1, wherein said color image reading means comprises a common image sensor for receiving reflected light from said document.

3. The apparatus of claim 1 wherein two of said plurality of developing means are arranged between said first writing position and said second writing position.

4. The apparatus of claim 1 wherein said image retainer is a photoreceptor.

5. The apparatus of claim 4 wherein said plurality of latent image forming means comprise charging means for charging said photoreceptor and exposing means for exposing said photoreceptor to form one of said latent images.

6. The apparatus of claim 5 wherein said exposing means is a laser beam scanner.

7. The apparatus of claim 6 wherein said laser beam scanner comprises a laser beam source.

8. The apparatus of claim 1 wherein said image retainer is a photoreceptor, and said two latent image forming means respectively comprise charging means for charging said photoreceptor and exposing means for exposing said photoreceptor to from one of said latent images.

9. The apparatus of claim 8 wherein said exposing means is a laser beam scanner comprising a laser beam source.

10. The apparatus of claim 9 wherein said charging means of a first latent image forming means, said first developing means, said second developing means, said charging means of a second latent image forming means, said third developing means, and said fourth developing means, are arranged in this order along the rotational direction of said photoreceptor, a first laser beam of said laser beam scanner of said first latent image forming means being scanned across said photoreceptor at said first writing position between said charging means of said first image forming means and said first developing means, and a second laser beam of said laser beam scanner of said second latent image forming means being scanned across said photoreceptor at a second point between said charging means of said second latent image forming means and said third developing means.

11. The color image forming apparatus according to claim 1, wherein a first latent image forming means, a first developing means, a second latent image forming means and a second developing means are arranged in this order around said image retainer, and at least one of said first and second developing means has a plurality of developing devices.

12. The color image forming apparatus according to claim 11, wherein said first and second latent image forming means are optical systems comprising a laser beam source respectively, and at least one optical element is used in common with each other.

13. The color image forming apparatus according to claim 12, wherein a rotary polygon mirror is used in common.

14. The color image forming apparatus according to claim 12, wherein an $f-\theta$ lens is used in common.

15. The color image forming apparatus according to claim 12, wherein at least two $f-\theta$ lenses are arranged separately and in parallel.

16. The color image forming apparatus according to claim 11, wherein said plural developing devices are arranged in one case removably therefrom.

17. The color image forming apparatus according to claim 11, wherein driving sources of said first and second developing means are made separately, and wherein said plural developing devices in said first or second developing means have one of said driving sources in common and are driven by switching with a clutch respectively.

18. A color image forming apparatus according to claim 11, wherein developing bias power sources of said first and second developing means are made separately, and wherein said plural developing devices in said first or second developing means have one of said developing bias power sources in common and are supplied by switching respectively.

19. The color image forming apparatus according to claim 13, wherein additionally an $f-\theta$ lens is used in common.

20. The color image forming apparatus according to claim 13, wherein, additionally, at least two $f-\theta$ lenses are arranged separately and in parallel.

21. The color image forming apparatus according to claim 17, wherein developing bias power sources of said first and second developing means are made separately, and wherein said plural developing devices in said first or second developing means have one of said developing bias power sources in common and are supplied by switching respectively.

22. The apparatus of claim 13 comprising color image reading means for optically scanning a document, means for forming color information based upon color separating information supplied by said reading means, and a plurality of image forming means for applying said color information to an image retainer, toner images being formed on said image retainer by a plurality of rotations of said image retainer, wherein;

a plurality of scanned laser beams are made incident to a surface of a photosensitive member at different positions and a composite image is formed, said plurality of laser beams being of varying wavelengths, said plurality of laser beams being combined into a common optical path by a combining means and incident upon a rotary polygonal mirror, reflected laser beams being again separated into separate optical paths by a separating means, said separated laser beams being incident respectively on the surface of the photosensitive member.

* * * * *